United States Patent
DeMartino

(10) Patent No.: US 6,567,429 B1
(45) Date of Patent: May 20, 2003

(54) WIDE AREA MULTI-SERVICE BROADBAND NETWORK

(75) Inventor: Kevin A. DeMartino, Andover, MA (US)

(73) Assignee: Dynamics Research Corporation, Andover, MA (US)

(*) Notice: Subject to any disclaimer, the term of this patent is extended or adjusted under 35 U.S.C. 154(b) by 0 days.

(21) Appl. No.: 09/324,381

(22) Filed: Jun. 2, 1999

Related U.S. Application Data

(60) Provisional application No. 60/087,770, filed on Jun. 2, 1998, and provisional application No. 60/088,281, filed on Jun. 5, 1998.

(51) Int. Cl.$^7$ .............................. H04L 12/28; H04J 3/16; H04J 3/02; H04J 14/00; H04J 14/02
(52) U.S. Cl. .................. 370/539; 370/395.64; 370/469; 359/115; 359/125
(58) Field of Search .................. 370/408, 400, 370/404, 395.61, 395.6, 350–356, 395.64, 465, 359, 360, 405, 406, 493, 424, 258; 359/118, 119, 125, 117, 124

(56) References Cited

U.S. PATENT DOCUMENTS

| | | | |
|---|---|---|---|
| 3,838,278 A | 9/1974 | Duguay et al. | 250/277 |
| 4,781,427 A | 11/1988 | Husbands et al. | 350/96.16 |
| 4,970,717 A | 11/1990 | Haas | 370/60 |
| 4,999,832 A | 3/1991 | Chen et al. | 370/85.14 |
| 5,043,975 A | 8/1991 | McMahon | 359/128 |
| 5,077,727 A | 12/1991 | Suzuki et al. | 359/123 |
| 5,107,361 A | 4/1992 | Kneidinger et al. | 359/135 |
| 5,285,305 A | 2/1994 | Cohen et al. | 359/110 |
| 5,317,658 A | 5/1994 | Bergland et al. | 385/16 |
| 5,351,146 A | * 9/1994 | Chan et al. | 359/118 |
| 5,422,772 A | 6/1995 | Udd et al. | 359/119 |
| 5,438,445 A | 8/1995 | Nakano | 359/124 |

(List continued on next page.)

OTHER PUBLICATIONS

Bohm et al., "The DTM Gigabit Network," Journal of High Speed Networks, 3:109–126, 1994.
DeMartino, Kevin, "STM Versus ATM Signal Processing," Presented at ICSPAT Conference, Oct. 1996.
DeMartino, Kevin, "Processing of Synchronous Communications Signals," Presented at ICSPAT Conference, Oct. 1995.

(List continued on next page.)

*Primary Examiner*—Kwang Bin Yao
*Assistant Examiner*—Hanh Nguyen
(74) *Attorney, Agent, or Firm*—Weingarten, Schurgin, Gagnebin & Lebovici LLP

(57) ABSTRACT

A national broadband network is based on fiber optic technology and scaled to cover a wide area, such as the contiguous lower United States. The network provides a high data rate interface for each subscriber and supports all the functions of the current telephone, Internet, and cable TV networks, with sufficient excess capacity to support future applications. Signals from several thousand subscribers are multiplexed on a single fiber pair connected to an intelligent switching center. Telephone central offices (COs) become multiplexing centers rather than switching centers, and the number of switching centers required to cover the nation is greatly reduced. Approximately 500 switching centers are interconnected by an optical backbone. Physical layer connections are established through the backbone between each pair of switching centers. Multiple ATM and/or STM connections are carried within each of these physical layer connections. The backbone is divided into optical network segments such that each segment covers approximately 1/8 of the contiguous United States. An integral number of space-wavelength channels are assigned to each connection through a network segment, with each of these connections containing many end-to-end subscriber connections. Space-wavelength channels are switched intact within the network segment, which simplifies signal processing and facilitates operation at extremely high data rates.

5 Claims, 15 Drawing Sheets

U.S. PATENT DOCUMENTS

| | | | | |
|---|---|---|---|---|
| 5,488,500 A | | 1/1996 | Glance | 359/127 |
| 5,528,283 A | | 6/1996 | Burton | 348/13 |
| 5,550,818 A | | 8/1996 | Brackett | 370/60 |
| 5,555,118 A | | 9/1996 | Huber | 359/125 |
| 5,572,347 A | | 11/1996 | Burton et al. | 359/124 |
| 5,579,143 A | | 11/1996 | Huber et al. | 359/130 |
| 5,600,466 A | | 2/1997 | Tsushima et al. | 359/124 |
| 5,659,351 A | | 8/1997 | Huber | 348/7 |
| 5,684,799 A | * | 11/1997 | Bigham et al. | 370/397 |
| 6,233,074 B1 | * | 5/2001 | Lahat et al. | 359/118 |
| 6,314,163 B1 | * | 11/2001 | Acompora | 379/56.2 |
| 6,363,079 B1 | * | 3/2002 | Barzegar et al. | 370/465 |
| 6,400,478 B1 | * | 6/2002 | Cheng et al. | 359/124 |

OTHER PUBLICATIONS

Delisle et al., "A Guide to Data Communications—B ISDN and How it Works" IEEE Spectrum, Aug. 1991.

Brackett et al., "A Scalable Multiwavelenght Multi Optical Network: A Proposal for Research on All–Optical Networks" Journal of Lightwave Technology 11:5/6 pp 736–752 Mar. 1993.

* cited by examiner

WIDE AREA MULTI-SERVICE BROADBAND NETWORK

CROSS REFERENCE TO RELATED APPLICATIONS

This application claims the benefit under 35 U.S.C. §119 (e) of U.S. Provisional Patent Applications Nos. 60/087,770 and 60/088,281, filed Jun. 2, 1998 and Jun. 5, 1998 respectively.

STATEMENT REGARDING FEDERALLY SPONSORED RESEARCH OR DEVELOPMENT

Not Applicable

BACKGROUND OF THE INVENTION

Currently, there are three types of communication networks that extend throughout the United States: the telephone networks, the collection of data networks that make up the Internet, and the cable television networks. These groups of networks are not integrated with each other, but are not entirely separate. Although the telephone networks were designed for voice, they can handle data communications and limited video (e.g., video phone and video teleconferencing). Similarly, the Internet and the cable networks, which were designed for data and video, respectively, can accommodate to some extent voice, data, and video. Over the long term, it is not beneficial to maintain three groups of non-integrated networks. Instead, there should be an integrated network that can handle all communications functions. Advances in communications technology, particularly fiber optic technology, make this goal feasible.

Data rates of greater than 1 terabit per second (Tb/s) over a single optical fiber have been demonstrated experimentally. In one case, a single fiber carried 126 wavelength division multiplexed (WDM) channels each modulated at 20 Gb/s. Fiber optic systems that can support terabit-per-second data rates and over 100 WDM channels are expected to become commercially viable within the next several years. With these capabilities, it is possible to construct networks that can accommodate extremely high data rates. A network architecture designed to exploit fiber optic capabilities would be significantly different, and much simpler, than the architectures of current networks.

The rationale for an integrated services digital network (ISDN) is to support various communication functions, including voice, data, and video on a single integrated network. Narrowband ISDN (N-ISDN) supports subscriber data rates up to T–1 rates (1.5 Mb/s) using existing twisted pair access lines. With broadband ISDN (B-ISDN), the goal is to provide subscriber data rates of 155 Mb/s and higher. This aggressive goal requires the fuller exploitation of the capabilities of fiber optic communications technology.

BRIEF SUMMARY OF THE INVENTION

An architecture is presented for a wide-area B-ISDN fiber optic network capable of covering the United States and providing a 155 Mb/s data rate for all U.S. subscribers. A data rate of this magnitude is more than enough to support current voice, data, and video requirements and retain capacity for future growth. In the proposed network architecture, the extremely high fiber capacity is exploited by multiplexing many subscriber signals on a single fiber. This allows the number of subscriber access lines and the number of switching centers in the network to be greatly reduced compared to current networks. Along with fiber capacity, the large number of possible WDM channels on a fiber can be exploited to construct an optical backbone network that interconnects network switching centers.

The disclosed network provides an STM-1 (155 Mb/s) interface for each subscriber in the U.S., which would support multiple voice, data, and video channels. The proposed network can provides all the features of the current telephone, Internet, and cable TV networks, with sufficient excess capacity to support future applications.

Signals from several thousand subscribers are multiplexed on a single fiber pair connected to an intelligent switching center. With this approach, telephone central offices (COs) become multiplexing centers rather than switching centers, and the number of switching centers required to cover the nation can be greatly reduced. With the proposed architecture, on the order of 500 switching centers are interconnected by an optical backbone. Physical layer connections are established through the backbone between each pair of switching centers. Multiple ATM connections are carried within each physical layer connection.

The backbone is divided into optical network segments such that each segment covers approximately ⅛ of the contiguous United States. An integral number of space-wavelength channels are assigned to each connection through a network segment, with each of these connections containing many end-to-end subscriber connections. Space-wavelength channels are switched intact by the network segment, which simplifies signal processing and facilitates operation at extremely high data rates.

Achieving the full STM-1 data rate requires running optical fiber to the subscriber premises. However, a useful broadband capability can be achieved in the near term using Asymmetric Digital Subscriber Loop (ADSL) technology, in conjunction with existing twisted pair subscriber access lines.

The proposed broadband network can be extended beyond the borders of the contiguous United States. Eventually the network can be expanded into a global network.

DETAILED DESCRIPTION OF THE INVENTION

The disclosures of U.S. Provisional Patent Applications Nos. 60/087,770 and 60/088,281, filed Jun. 2, 1998 and Jun. 5, 1998 respectively, are hereby incorporated by reference.

Figure 1:
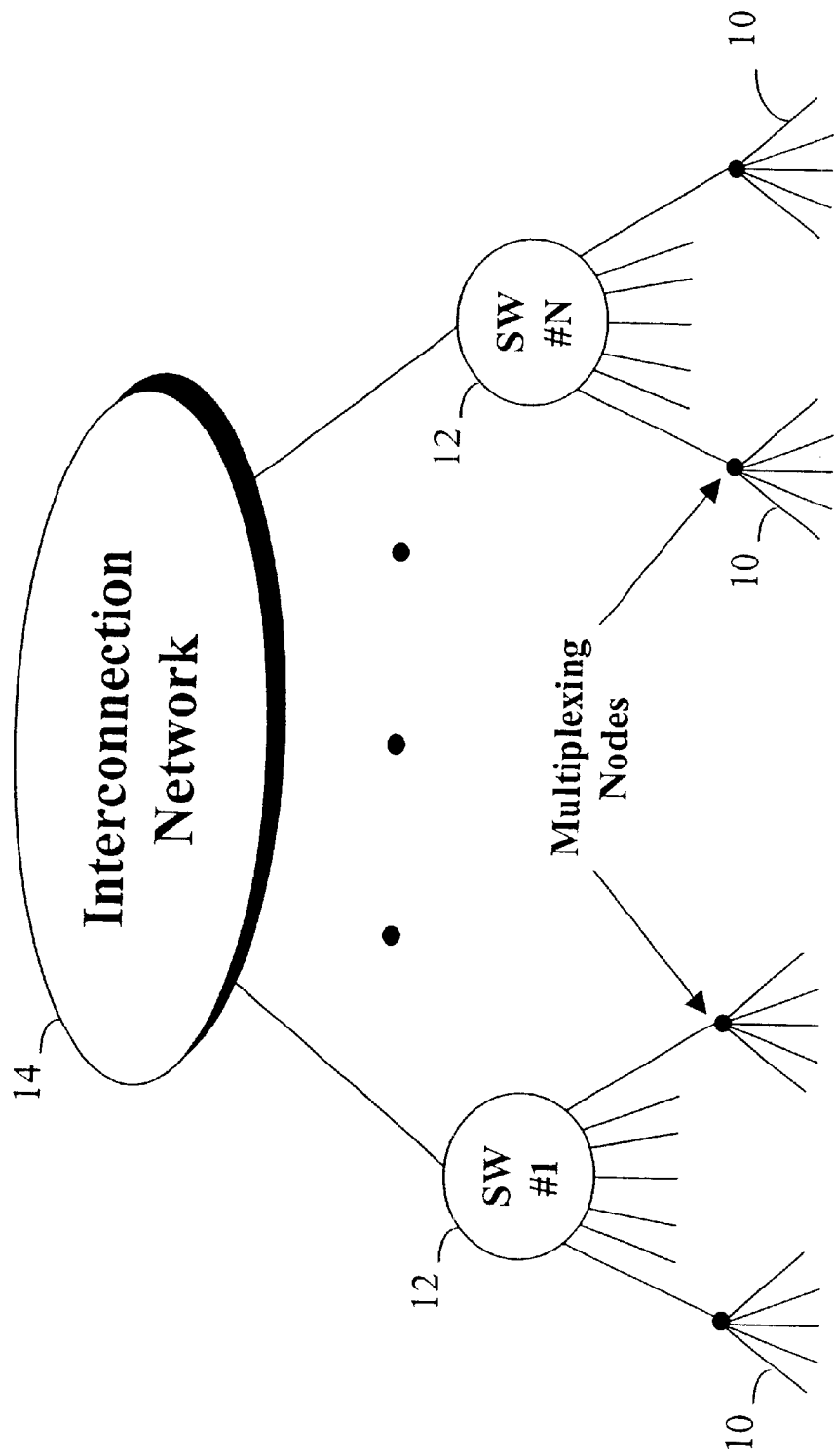
FIG. 1 is a block diagram depicting a general architectural model for a national communications network.

FIG. 1 shows a generic architecture for a national communication network, which includes subscriber access lines 10, a number of switches 12, and a network segment 14 for interconnecting the switches 12. In a general way, the telephone networks fit within this architectural model, with the telephone central offices (COs) corresponding to the switches 12 in FIG. 1. Similarly, with the switches 12 corresponding to subscriber entry points at the Internet service providers (ISPs), this model also generally describes the Internet. There is a trade-off between the number of switches 12 and the length of the subscriber access lines 10. As the number of switches 12 decreases, the length of the access lines 10 must be increased. However, multiplexing of subscriber signals allows the average length of the access lines 10 to be reduced.

Figure 2:
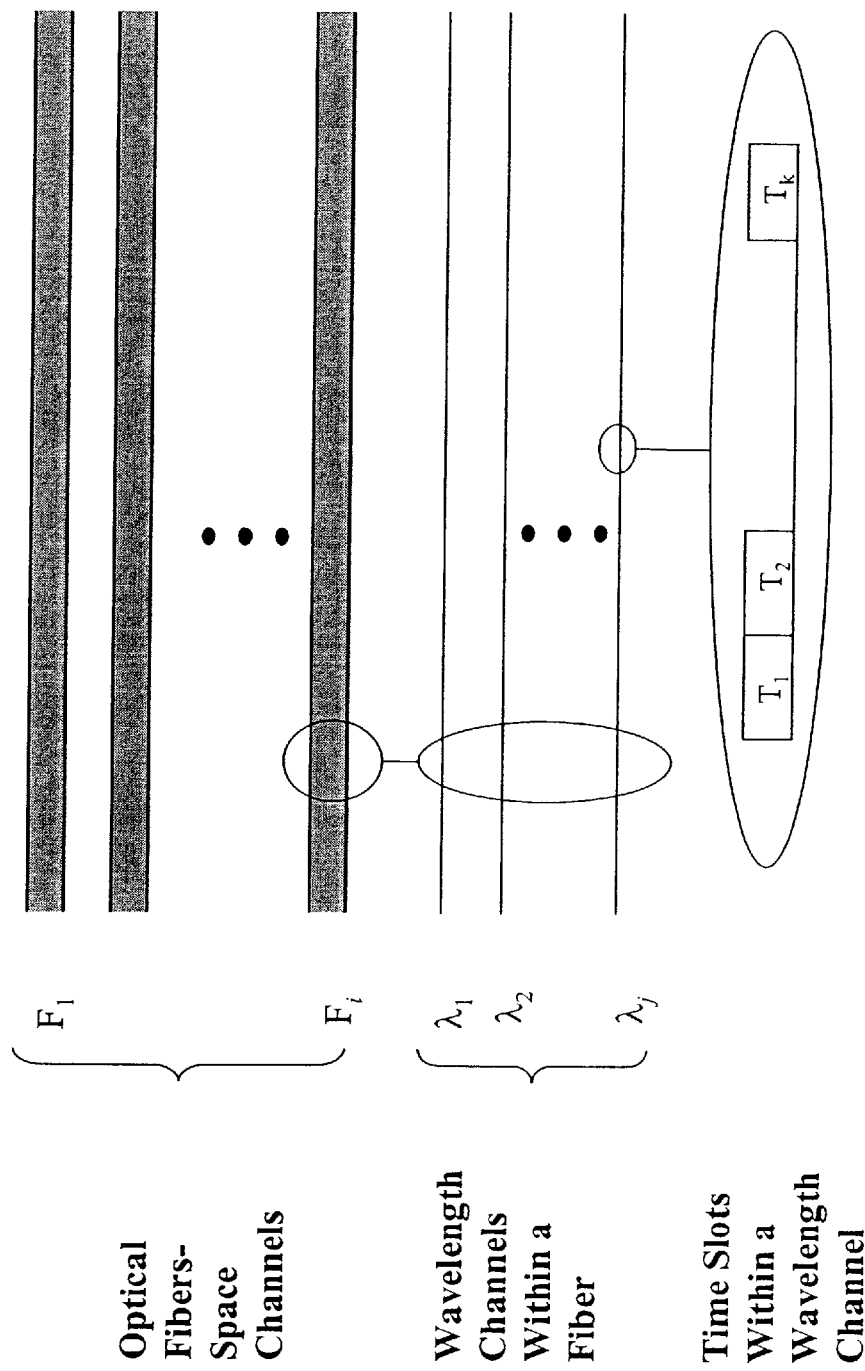
FIG. 2 is a diagram illustrating a hierarchy of communications channels within a fiber optic communications cable.

FIG. 2 shows the hierarchy of channels within a fiber optic cable, which may be used to connect the elements in FIG. 1. The optical fibers $F_1, \ldots, F_i$ within a cable are spatially separated and can be viewed as different space channels. Hundreds of fibers can fit within a moderate size cable. Within each fiber, there can be signals at many different wavelengths $\lambda_1, \ldots \lambda_j$. Hundreds of separate wavelength channels within a fiber are possible.

An optical signal at a particular wavelength can be modulated at data rates up to tens of Gb/s. However, the data rate is limited by the spacing of wavelength channels and electronic processing speeds. For a fiber containing many WDM signals, a practical limit on the data rate for each wavelength channel is 10 Gb/s. As discussed below, each wavelength channel can be divided into many time slots $T_1, \ldots, T_k$. The total number of channels within a fiber optic cable is the product of the number of space channels (i) times the number of wavelength channels (j) times the number of time slot channels (k). Each fiber within the cable can support millions of DS0 (64 Kb/s) channels. Wavelength channels within a fiber, and space channels within a cable, can be viewed collectively as an ordered set of space-wavelength channels. Within this set, a channel is said to be contiguous with channels corresponding to the next higher or next lower channel in the order.

To fully interconnect N switches requires N—x—(N−1) different paths through the interconnection network. To provide continuous data flow between each pair of switches one or more channels must be assigned along the path of each connection.

An important aspect of network design is topology, specifically the way in which the network switches are interconnected. One approach building the interconnection network 14 of FIG. 1 is to directly connect each switch to one or more of the other switches, which would produce a mesh topology. In this case, the interconnection network in FIG. 1 would not contain any switching elements and the total number of switches would be minimized. However, with a mesh topology, either a large number of connections between switches must be provided or signals traversing the entire network must pass through a large number of switches.

A strong case can be made for a more hierarchical approach to networking, where the interconnection network contains switches arranged at different layers or echelons. With a hierarchical network, routing is simplified and the number of switches encountered in traversing from one end of the network to the other is minimized. Also, with a hierarchical network, the throughput requirements for the lower echelon switches can be reduced.

Signals that follow a common path through a network segment can be bundled together and switched intact by the switches within the segments. In a hierarchical network, the upper echelons can be viewed as a network segment interconnecting the switches at the lower echelons. The number of paths is significantly reduced in going from one echelon to the next higher echelon, and data can be further aggregated at each higher echelon. As signals ascend through the network, bundles of signals can be combined into larger bundles, which are then divided into smaller bundles when the signals descend through the hierarchy. As discussed in a later section, this aggregation of signals facilitates optical processing at the higher echelons, and is the main argument for a hierarchical structure for the proposed national B-ISDN network.

A disadvantage of a hierarchical structure is that the lengths of transmission lines and propagation delay through the upper echelons are longer than necessary. Transmission lines and propagation delays can be shortened if the national network is divided into regional segments arranged in mesh topology. This also facilitates extending the network beyond the borders of the United States. This feature of the proposed network is discussed in more detail below.

Access lines from multiple subscribers can be grouped together at a junction point, and subscriber signals can be multiplexed on different space, wavelength, and/or time channels. With the extremely high capacities provided by fiber optics, many high data rate signals can be multiplexed on a common cable, which allows the length of access lines/cables and the number of switches to be reduced.

The output line of a multiplexer must have a large enough capacity to accommodate the sum of the maximum data rates on the input lines of the multiplexer. If the multiplexer output line has sufficient capacity then the subscriber signals can be combined and transported to a higher echelon. Alternatively, subscriber signals entering a node can be switched rather than multiplexed. Some subscriber data can be switched directly onto other subscribers' lines without transporting it to a higher echelon.

A key consideration in network design involves where to draw the line between multiplexing and switching. Switches are considerably more complex and costly than multiplexers. Thus, it is desirable to minimize the number of network switches. On the other hand, switching at a lower echelon reduces the data rates at the higher echelons, which allows the capacities of the switches and transmission lines in the higher echelons to be reduced. With the advent of fiber optics, it is possible, and cost-effective, to move in the direction of more multiplexers and fewer switches.

The current analog telephone networks employ circuit switching, where one pair of subscriber lines is connected by the network to another pair of lines, and these lines are dedicated to the connection for the duration of the call. With the transition to digital networks, and particularly ISDN, different channels on a set of access lines can be switched independently. N-ISDN provides subscribers with a number (typically two) of DS0 (64 Kb/s) data channels and a separate channel for signaling between the subscriber and the network. Using the control information in the signaling channel, the network switches data channels to establish connections between subscribers. Multiple data channels can be bundled for a single connection. Although this type of operation is still referred to as circuit switching, it is more accurate to call it "channel switching."

With channel switching, physical layer connections are established between subscribers, and channels are assigned to each connection for the duration of the connection. Data associated with a particular connection is transferred at a fixed rate in pre-assigned time slots. This technique is referred to as synchronous transfer mode (STM). For bursty data, the utilization of the channels is low and STM is inefficient. On the other hand, the switching pattern for STM signals is predetermined and held constant for an interval of time. Consequently, STM control signals can be separated from the data and processed more slowly. Also, with STM, a large amount of data can be switched as a single block. These factors facilitate optical processing of STM signals.

With packet switching, transmission resources (e.g., time slots) are not dedicated to a particular connection, but instead are dynamically assigned based on demand. Asynchronous transfer mode (ATM) is a form of fast packet switching where data blocks are divided into small fixed size packets, or cells, that are transferred at a variable rate in available time slots. ATM has been selected as the B-ISDN standard for transferring data.

In ATM networks, virtual connections are established between subscribers desiring to communicate with each other. A specific route is determined for each ATM virtual connection. However, unlike the case with STM, channels are not assigned to particular connections. ATM cells are switched independently of each other based on control information in the cell header. ATM cells are dynamically assigned to available channels, which makes ATM more efficient than STM for bursty data. However, processing and switching are more difficult for ATM than for STM. With ATM, control signals are processed along with the data, and switching decisions are made on the fly. This makes it difficult to implement ATM processing with optical components.

When N independent data sources are combined, the average data rate is increased by a factor of N and the standard deviation of the data rate is increased by a factor of the square root of N. However, the ratio of the standard deviation to the average data rate, which is a measure of the burstiness of the data, is reduced by a factor of the square root of N. Note that to reduce the burstiness of the data stream by aggregating data, the data sources must be independent (or at least uncorrelated). Aggregating data from a single source over time does not necessarily smooth the data stream.

At the lower echelons of the network, the data rate is relatively low, but the data stream tends to be bursty. At the higher echelons, signals from many sources can be bundled together producing a higher data rate but reducing the burstiness of the data. Thus, at the lower echelons it may be desirable to use packet switching and ATM for transmission efficiency. At the higher echelons, channel switching and STM are more suitable in order to simplify processing and facilitate the use of high-speed optical components.

The physical layer standards for broadband ISDN (B-ISDN) specify the synchronous digital hierarchy (SDH) of data rates and the synchronous transport module (STM) frame structures. Note that "STM" as used here is related to, but somewhat different from, the previous use of the acronym for Synchronous Transfer Mode. SDH data rates are integral multiples of the fundamental SDH data rate of 155 Mb/s, which is three times the basic synchronous optical network (SONET) rate. Corresponding to the fundamental SDH rate is the STM-1 frame structure. Higher order STM frames are formed by byte interleaving lower order frames. For example, the STM-64 frame, which corresponds to a data rate of approximately 10 Gb/s, can be formed by interleaving 64 STM-1 frames. All STM frames have intervals of 125 $\mu$s and a corresponding repetition rate of 8000 frames per second.

Figure 3:
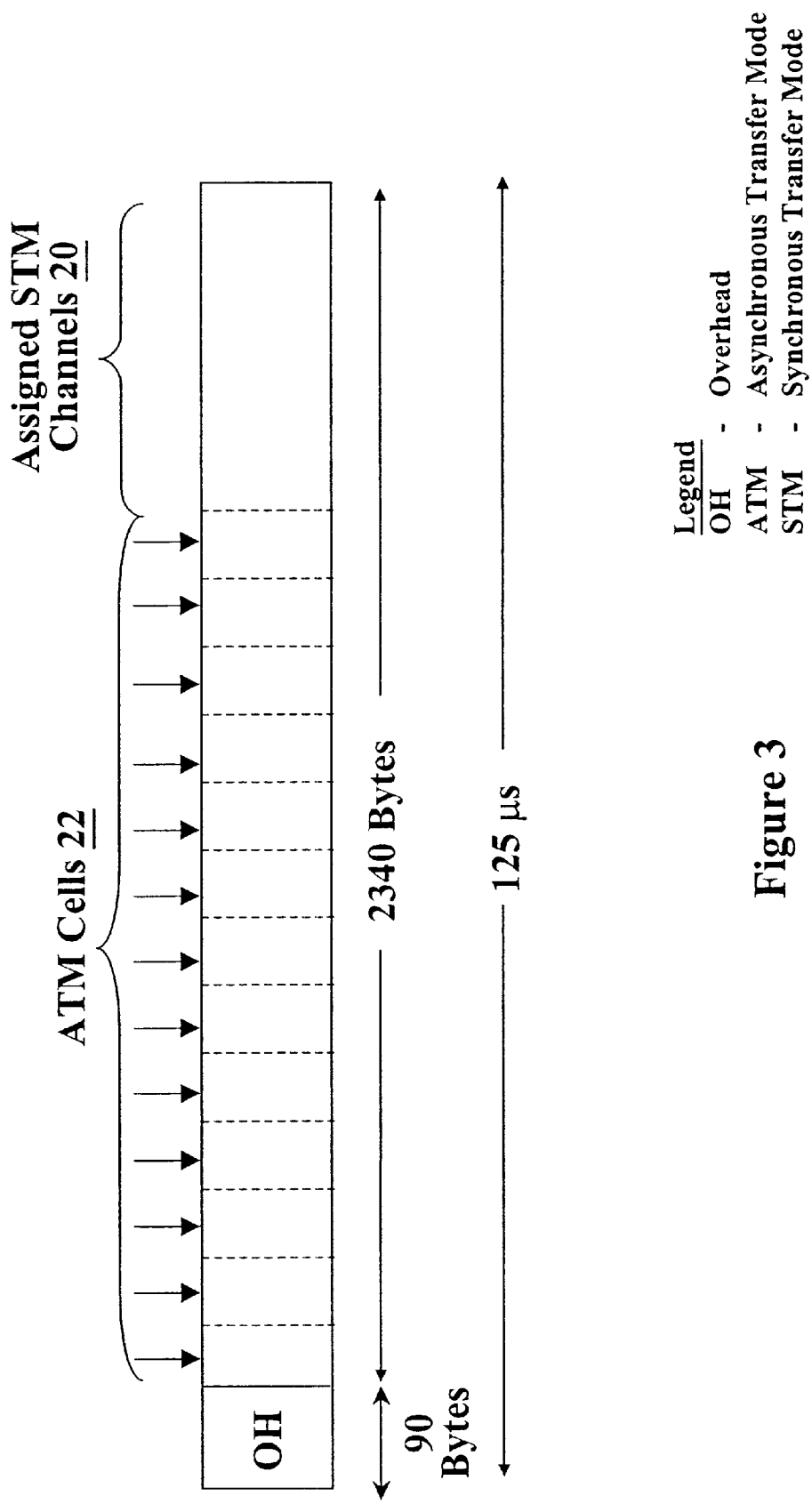
FIG. 3 is a diagram showing the structure of a Synchronous Transport Module (STM) frame used communications networks.

As shown in FIG. 3, an STM-1 frame has a payload of 2340 bytes. Each byte within the payload can be viewed as a time slot that is equivalent to a DS0 channel. Data can be transferred at the physical layer using STM (synchronous transfer mode) or at the data link layer using ATM. The frame can be divided into two regions corresponding to the two different transfer modes. Time slots within an STM region 20 are assigned to particular connections. A few time slots can be set aside for signaling between the subscriber and the network, and used to establish connections and assign channels. Time slots in an ATM region 22 are not assigned to particular connections. ATM cells associated with a particular virtual connection can appear at any locations within the ATM region 22, and these locations can vary from frame to frame.

A fiber that contains 100 WDM signals each modulated at 10 Gb/s can carry 6400 STM-1 signals. At each wavelength, 64 STM-1 signals (155 Mb/s) are time multiplexed to form an STM-64 signal (10 Gb/s). Then, 100 STM-64 signals are wavelength multiplexed to form a 1 Tb/s composite signal. There are about 160 million (M) subscriber access lines (mostly twisted wire pairs) within the U.S. Not all of these lines are currently in use. Approximately 25 thousand (K) fibers are required to support STM-1 interfaces for 160M U.S. subscribers.

Figure 4:
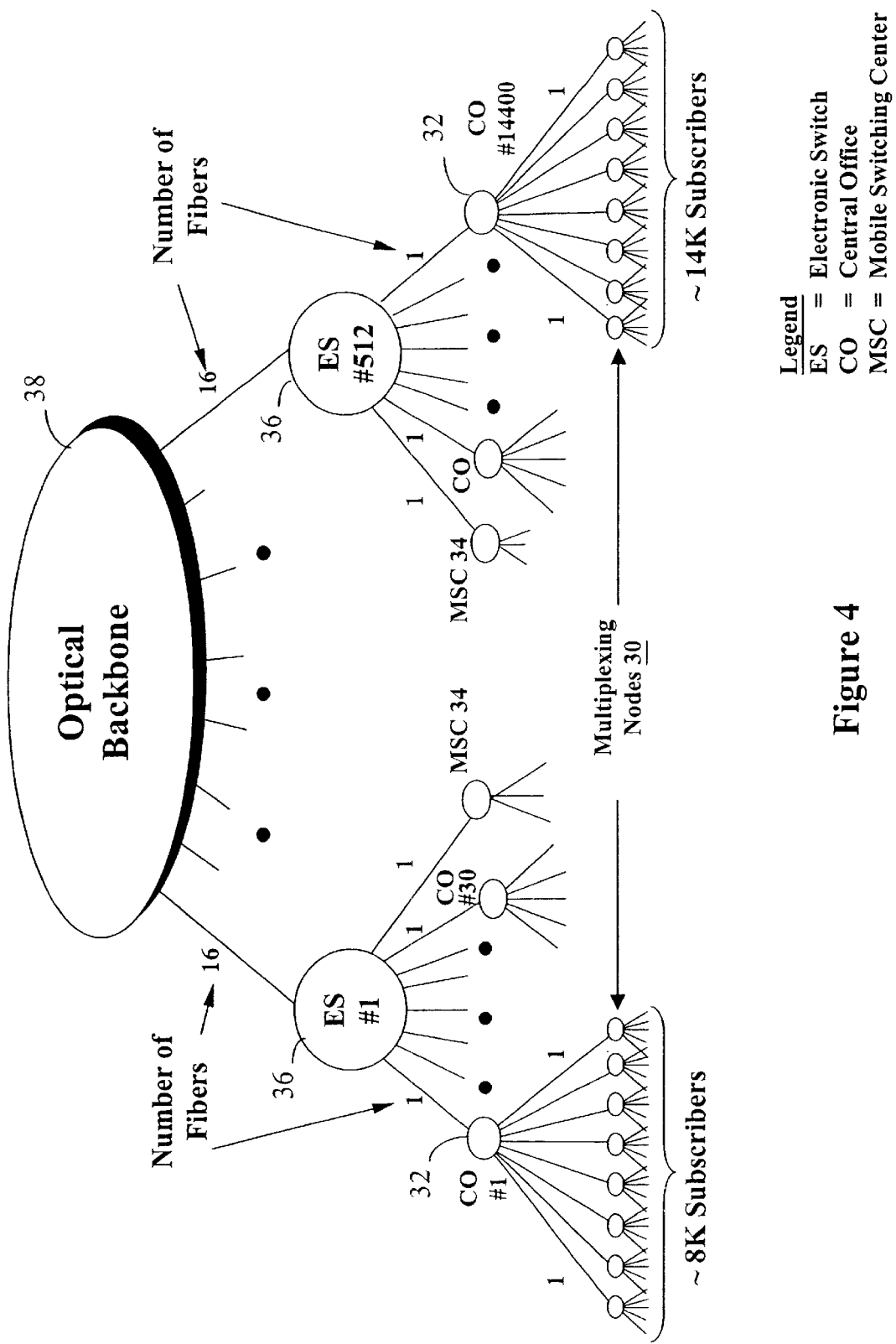
FIG. 4 is a block diagram of a Broadband ISDN fiber optic network in accordance with the present invention.

FIG. 4 shows the basic architecture for the proposed national B-ISDN fiber optic network. This network is scaled to cover the 48 contiguous states of the United States. Access lines are provided for 160M subscribers at fixed locations and for mobile subscribers, who are not included in the 160M. Access lines are brought together at multiplexing nodes 30 where many subscriber signals are combined on a single fiber. Additional multiplexing is performed at the level of Central Offices (COs) 32 and Mobile Switching Centers (MSCs) 34. At the level where the subscriber signals no longer fit on a single fiber, switching is performed. This occurs at the level where 512 electronic switches 36 are shown in FIG. 4. Each CO 32 and MSC 34 is connected to an electronic switch 36 by a single fiber carrying signals in both directions. Each electronic switch 36 is connected to an optical backbone 38 by eight fiber pairs (16 fibers), such that the fibers within a pair carry signals in opposite directions.

In current networks, the telephone central office (CO) is the switching node where subscriber lines come together to access the telephone network, and indirectly to access the Internet. There are over 14,000 COs in the U.S., with an average of approximately 10,000 subscribers per CO. In the network of FIG. 4 there are multiplexing nodes 30 beneath the echelon containing the COs 32. At each of the multiplexing nodes 30, up to a few hundred subscriber signals are multiplexed and demultiplexed. A single fiber between a lower echelon node 30 and a CO 32 can easily accommodate a few hundred STM-1 signals flowing in both directions.

The capabilities of fiber optic technology make it practical to fundamentally change the role of the CO 32 compared to its current role in telephone networks. The CO 32 becomes a multiplexing/demultiplexing center rather than an intelligent switching center. This greatly reduces the complexity of the equipment required at a CO 32. Data for all the subscribers attached to a CO 32 is multiplexed on a single fiber and carried to a higher echelon switching node 36. Similarly, all the data flowing in the opposite direction from the higher echelon to the subscribers can be carried on a single fiber. For example, if a CO 32 services 10,000 subscribers and each is operating at 100 Mb/s, then the total data rate is 1 Tb/s, which can be accommodated by a single fiber. The distance between a CO 32 and the next higher echelon can be relatively short (typically less than 25 miles), and the transmission losses can be held low. Consequently, amplifiers are not needed between a CO 32 and a higher echelon switch 36, and data can be carried in both directions on the same fiber.

In the proposed network architecture, many COs 32 (20 to 40) within a local area (typically within a 25-mile radius) are connected to an electronic switch 36 at the next higher echelon. Fibers from several nearby COs 32 can be combined (space multiplexed) within a common cable so that the number of long cable runs between the COs 32 and the electronic switch 36 can be minimized. In the proposed network, it takes approximately 500 switches to cover the U.S.

Mobile network subscribers are connected by radio links to base stations, which are in turn connected to mobile switching centers (MSCs) 34. MSCs 34 in mobile networks are analogous to COs in telephone networks. In the proposed B-ISDN architecture, signals from many mobile subscribers are multiplexed at an MSC 34 onto a single fiber connected to an electronic switch 36. Since the data rate for a mobile subscriber is typically much lower than the STM-1 data rate, many thousands of mobile subscriber signals can be carried between an MSC 34 and an electronic switch 34 in both directions by a single fiber.

There are a total of 20 to 40 fibers entering each electronic switch 36 from the lower echelon. Each electronic switch 36 handles data to/from approximately 300K subscribers. It is assumed that the maximum utilization will be less than 25% of the total capacity. This corresponds to a maximum data rate of approximately 10 Tb/s to/from the COs 32 that must be processed by an electronic switch 36. For scaling purposes, it is assumed that 50% of the traffic is local to the electronic switch and does not pass through the optical backbone 38. The distance between an electronic switch 36 and the nearest node in the optical backbone 38 is typically between 50 and 100 miles, but can be longer. Consequently, optical amplification may be required along the transmission path between an electronic switch 36 and the optical backbone 38, which makes it difficult to transmit signals in both directions within a fiber. Based on these considerations, eight fiber pairs (or 16 fibers) are used to handle the data flow between an electronic switch 36 and the optical backbone 38, each fiber in a pair carrying data in different directions.

With only 512 electronic switches 36 required to cover the U.S., it is feasible to provide a physical layer connection between each pair of switches 36. Each of these connections consists of multiple STM-1 channels through the interconnection network. Many STM and ATM connections can be bundled within each physical layer connection between a pair of switches.

The proposed national B-ISDN network is capable of providing STM-1 service to each subscriber. The STM-1 payload of 150 Mb/s, which is equivalent to 2340 DS0 channels, is more than adequate for current voice, data communications, video-on-demand, and broadcast video applications. These applications can be accommodated using STM, ATM, or a combination of the two. A few DS0 channels (time slots within the STM-1 frame) can be dedicated to signaling between the subscriber and the network. These channels can be used to request the establishment and release of physical layer connections and for the assignment of channels to these connections.

Voice communication requires only one DS0 channel in each direction. The most straightforward way to handle voice is to provide a dedicated DS0 channel for the duration of call using STM.

For many data communication applications, the data stream is bursty and STM is inefficient. For low data rate applications, STM can be used with only a few dedicated DS0 channels. Applications involving the transfer of large amounts of data, e.g., large file transfers, require moderately high data rates (compared to 150 Mb/s) for short periods. These applications can be accommodated using ATM, if a significant portion of the STM-1 frame is reserved for ATM cells. Another approach is to assign a relatively large number of DS0 channels to a particular connection for a short period of time and release them when the data transfer is completed. The switching elements in the architecture of FIG. 4 are capable of switching quickly, and the time required to establish or release connections is limited by propagation delays. The network can be designed to establish or release connections in a small fraction of a second.

The most demanding requirement in terms of high data rates for extended periods of time is full motion video. Direct encoding of National Television Standards Committee (NTSC) video, which is currently the standard video in the U.S., requires data rates in excess of 200 Mb/s. However, video data rates can be significantly reduced if data compression techniques are employed. Using the Moving Pictures Experts Group (MPEG)-2 compression, the data rate for broadcast quality NTSC video can be reduced to 4–6 Mb/s. With these data rates, 25 or more video channels can be accommodated simultaneously within an STM-1 frame, using either ATM or STM. Although the number of simultaneous video channels is limited, the subscriber can access additional video channels by switching the connection in real time to another video server.

Future applications might include high definition television (HDTV) and multimedia applications with high video content. HDTV video contains approximately five times the number of pixels as NTSC video and requires approximately five times the data rate. With MPEG-2 compression, HDTV video requires a data rate of 20 to 30 Mb/s. Only a relatively small number of HDTV video channels (5 or 6) can be accommodated simultaneously by an STM-1 interface. However, a subscriber could access additional HDTV channels by switching to another port on the HDTV server or to another server.

Figure 5:
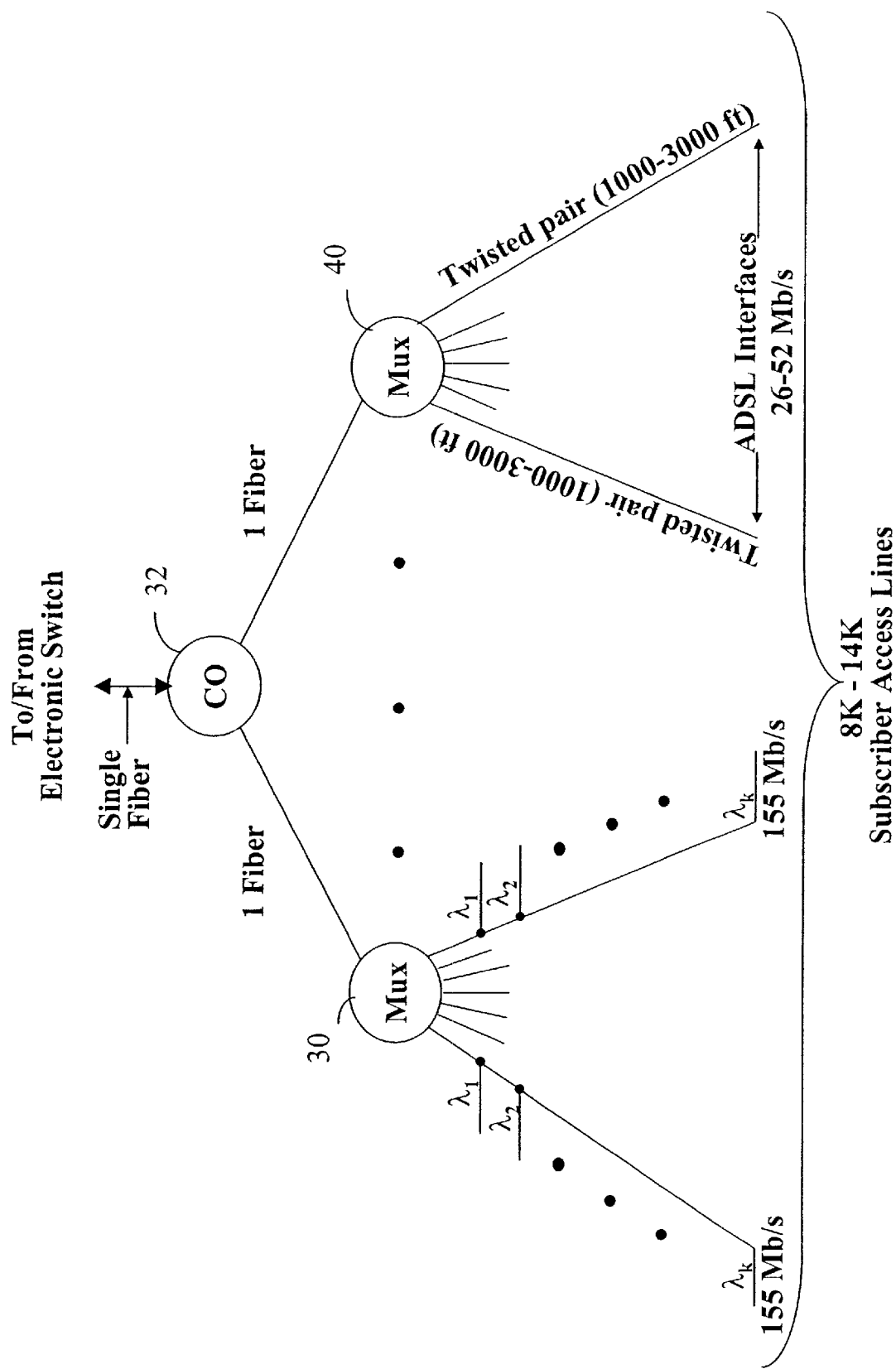
FIG. 5 is a block diagram of a portion of the network of FIG. 4 in which connections to individual subscribers are made.

Implementing the national B-ISDN network requires deployment of fiber into the subscriber loop. As shown in FIG. 5, multiplexing nodes 30 placed between a CO 32 and the subscribers, with each multiplexing node 32 connected to the CO 32 by a single fiber that carries signals in both directions. To achieve the full STM-1 data rate, fiber must be extended all the way to the subscriber premises. There are various ways for connecting subscribers to the multiplexing node 30. One option is to wavelength multiplex signals for multiple subscribers on a single fiber and assign a particular wavelength to each subscriber. As the fiber passes by the premises of a subscriber, the signal at a particular wavelength is coupled onto a fiber that runs from the street into the subscriber's premises.

Replacing existing twisted pair access lines with fiber for all U.S. subscribers will take a long time and will cost a lot of money. This conversion can be made more palatable if the transition to B-ISDN is implemented in stages with fiber optic lines gradually extended throughout the subscriber loop. Asynchronous digital subscriber line (ADSL) technology, which can support much higher data rates than current subscriber interfaces without running fiber all the way to the subscriber, can be employed as an interim solution.

ADSL uses a modulation scheme that supports high data rates in one direction over twisted pairs. With ADSL, high data rates can be provided in the downstream direction (from the network to the subscriber), but to minimize interference, data rates in the upstream direction must be considerably lower. With respect to high data rate applications, such as large file transfers or video, most subscribers will act as clients accessing data from servers. For these subscribers, data flows primarily in the downstream direction, and ADSL provides what is needed. For servers, data flow will be primarily in the upstream direction, and other interfaces are more appropriate than ADSL. For example, video servers with many channels may need fiber all the way to the server's location.

In the transition to B-ISDN, the data rate that can be achieved with ADSL can be increased as fiber optic lines are extended closer to the subscribers and the length of twisted pair access lines is reduced. FIG. 5 also shows an approach for extending fiber into the subscriber loop, which is similar to a digital loop carrier (DLC) approach currently used for multiplexing subscriber signals over T–1 lines. A fiber optic cable containing a single fiber, and replacing a cable containing up to a few hundred twisted pairs, is run from a CO 32 to an ADSL multiplexer 40 in the subscriber area. Each multiplexer 40 is connected to up to a few hundred subscribers using ADSL over existing twisted pair access lines. Using this approach, the average length of twisted pair access lines in the U.S. can be reduced from approximately 10,000 ft to approximately 2,000 ft.

Using the approach shown in FIG. 5 with access lines between 1,000 and 3,000 ft., downstream data rates of 26 Mb/s to 52 Mb/s can be achieved with ADSL. These data rates correspond to between ⅙ and ½ of the STM-1 rate, and are more than adequate for most applications. Several compressed NTSC video channels can be supported, but only one or two HDTV channels. Although this transitional approach cannot support HDTV broadcast video, fiber may be extended closer to the subscriber by the time broadcast HDTV becomes widespread, and higher data rates may be achievable.

In the national B-ISDN network, the electronic switches 36 of FIG. 4 are the central elements, where most of the network intelligence resides. Access lines from all the multiplexing nodes 30 are brought together in these switches 36. Each electronic switch 36 is connected to all the other electronic switches 36 by the optical backbone 38. The electronic switches 36 must determine the routing for all the individual connections between pairs of subscribers and manage the operation of these connections throughout the network.

Each electronic switch 36 is connected to 20 to 40 COs 32 and to a number of MSCs 34 at the lower echelon. A single fiber provides more than enough capacity to handle all the data in both directions between a CO 32 and the electronic switch 36. Thus, some of the wavelength channels on the fibers connecting the COs 32 to the electronic switches 36 will not be occupied. Each electronic switch 36 supports an average of 320K subscribers, not counting mobile subscribers (whose contribution to the overall data rate is ignored for present purposes). To accommodate 320K subscribers operating at 25% of the maximum data rate requires 80K STM-1 channels or approximately 1200 STM-64 channels through the electronic switch 36.

Figure 6:
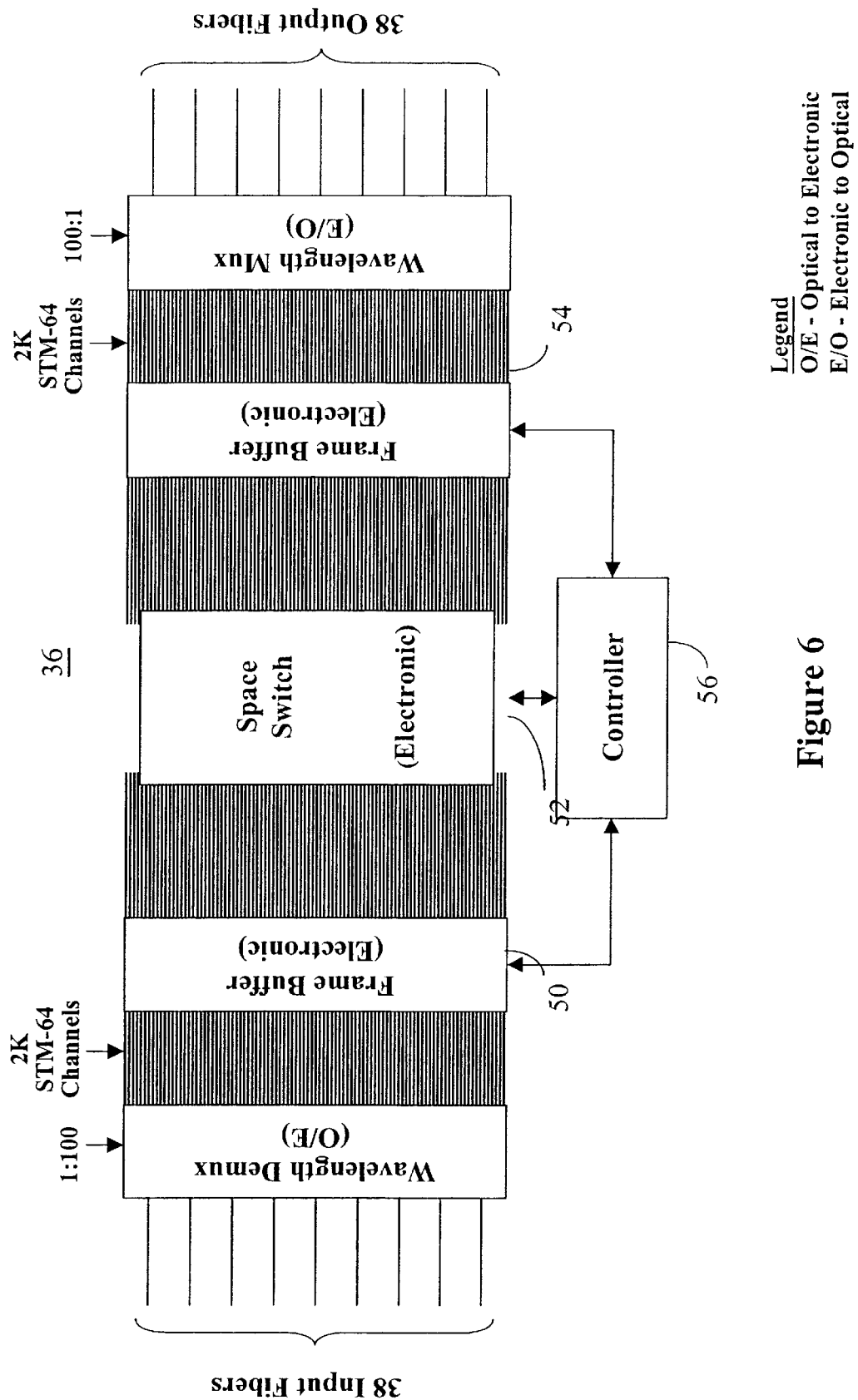
FIG. 6 is a block diagram of an electronic switch used to interconnect subscribers in the network of FIG. 4.

FIG. 6 shows a block diagram of one of the 512 electronic switches 36. In the case shown, there are 38 input fibers and 38 output fibers, of which 30 are connected to COs 32 at the next-lower echelon, with input and output signals transmitted in different directions over a common fiber. Eight input/output fiber pairs are connected to the optical backbone 38, with input and output signals transmitted over different fibers of a fiber pair.

For each input fiber, signals at different wavelengths are demultiplexed onto separate channels. As previously discussed, not all the available wavelength channels are used. The switch 36 is scaled to accommodate approximately 2000 space-wavelength channels each containing an STM-64 signal. Approximately 1200 of these channels are associated with inputs from the COs 32 and 800 are associated with inputs from the optical backbone 38.

The block diagram of FIG. 6 represents a generic structure that can be used for synchronous and asynchronous transfer modes, i.e., STM and ATM. For STM operation, each STM-64 frame is stored for one frame time (125 $\mu$s) in an input frame buffer 50. For each STM-64 channel, data from the previous frame is read out while data from the current frame is being read in. Data can be read out of the frame buffer 50 in an order different from the order in which it was read in, which allows time slots to be interchanged. Data is switched from the input lines to the output lines of a space switch 52, with the switching pattern changing from time slot to time slot (or byte to byte). Data exiting the space switch is stored in an output frame buffer 54 until the next frame interval when it is read out. In reading out the data, the output frame buffer 54 can perform a second interchange of time slots. Thus, the switch 36 employs three stages of switching, time switching, space switching, and time switching. Data in any time slot on any input line can be placed in any time slot on any output line.

For STM operation, a relatively small number of the many time slots within each STM-64 frame can be dedicated to carrying signaling information for controlling the channels. A controller 56 reads the signaling information and determines the switching pattern for mapping input channels to output channels, which includes time slot interchange parameters for all the STM-64 channels and space switching parameters for all the time slots. With STM, the routing of signals through the switch is predetermined. The controller 56 sends control information to the frame buffers 50 and 54 and the space switch 52. The control information is used to control the switching of each byte through these elements.

The switching pattern is modified whenever a connection is opened or closed or when the number of DS0 channels assigned to a connection is changed. With proper design of the switch 36, connections can be established sequentially without modifying previously established connections and without blocking occurring within the switch.

It may be undesirable to build a switch that operates at the STM-64 data rate of 10 Gb/s. A way around this problem is to slow down the data rate in the input buffer 50 so that data is read out at a lower rate than the rate at which data is read in. It may be desirable to reduce the data rate by a factor of four to the STM-16 rate of 2.4 Gb/s. This requires a four-fold increase in the number of buffer output lines. Approximately 8K STM-16 channels at the output of the buffer 50 are sufficient to accommodate approximately 2K STM-64 channels at the input to the buffer 50. At the output frame buffer 54, the situation is reversed and data is read in at the STM-16 rate and read out at the STM-64 rate.

Although there are a large number of channels in the electronic switch 36, memory and processing requirements are not excessive. For STM operation, approximately 600 MB of data storage is required in both the input and output frame buffers 50 and 54. In view of the current state-of-the-art in memory devices, these are moderate size memories. For a three-stage space switch, approximately 4M elementary gates are required to guarantee non-blocking operation. Since over 1M gates can be constructed on a chip, this is not an excessive number of gates. Actually, pin limitations and the large number of input/output lines required are more significant factors than the number of gates.

ATM operation is similar to, but more complex than, STM operation. As with STM, data from the previous STM-64 frame is switched while data from the current frame is being read into the input buffer 50. Unlike STM, the switching pattern is not predetermined, but instead must be determined on the fly based on information in the header of the ATM cell. Also, headers must be modified as ATM cells pass through the switch. Consequently, the computation rate must be much higher for ATM than for STM. Also, with ATM, there can be conflicts with too many cells destined for the same output lines. In this case, cells may have to be buffered for more than one frame, and additional storage is required in the input and output buffers 50 and 54 to accommodate cells that cannot be immediately transferred.

For ATM operation, the additional memory requirements have a relatively minor impact on the degree of difficulty in implementing the electronic switch 36. Additional computation requirements are more significant, particularly computations for on-the-fly routing of ATM cells. This computational problem can be alleviated if routes for the most active virtual connections are predetermined and channels are reserved. However, this approach would reduce the efficiency of ATM for transferring bursty data.

Figure 7:
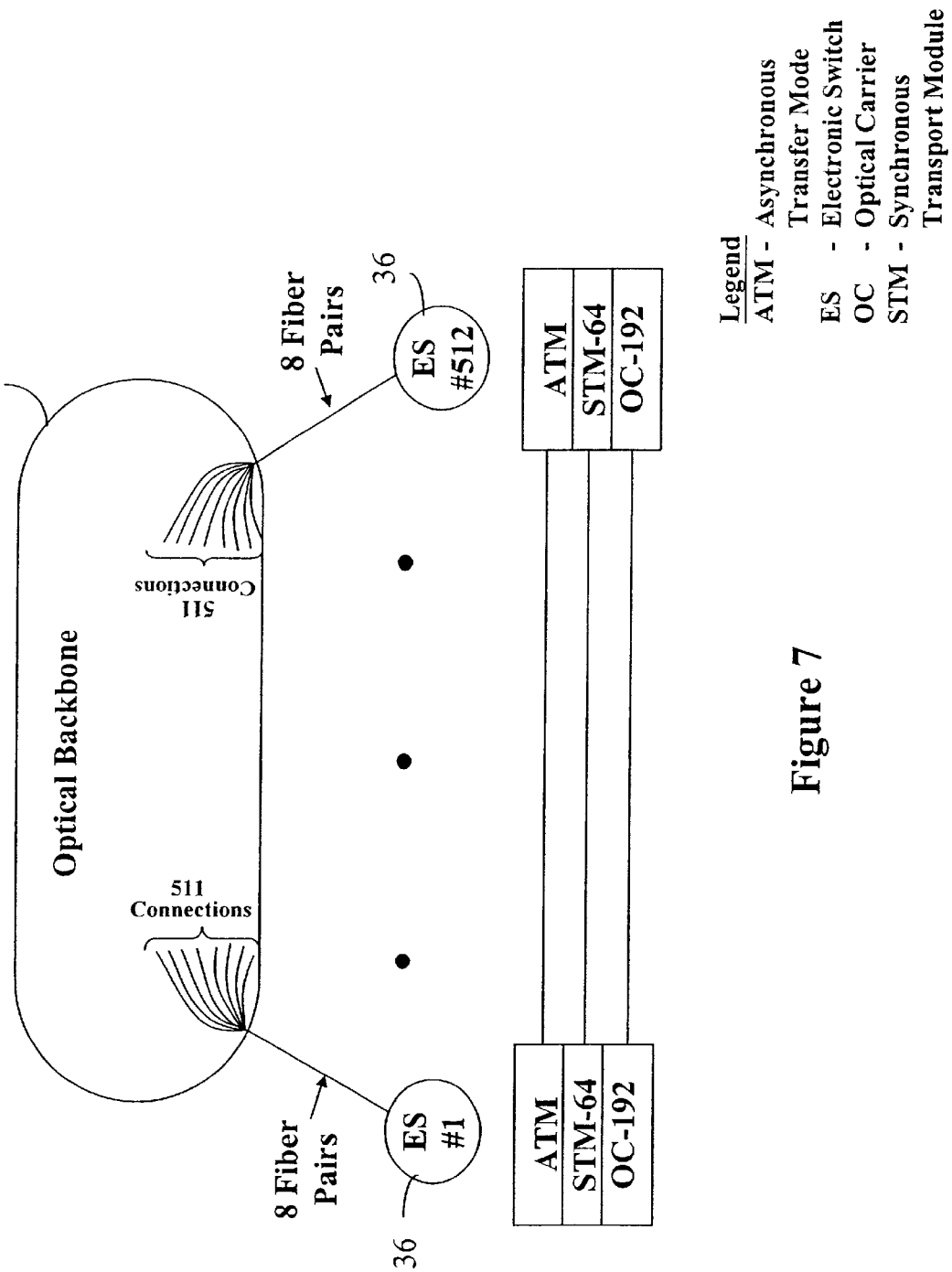
FIG. 7 is a diagram depicting the interconnecting of electronic switches via an optical backbone in the network of FIG. 4.

As shown in FIG. 7, the optical backbone 38 connects together 512 electronic switches 36. The optical backbone 38 represents the top echelons of the National B-ISDN network. There are 511 connections for data flowing from each electronic switch 36 to the other switches 36, which results in a total of 262K simplex (one-way) connections through the optical backbone 38. Physical layer (STM) connections are established between each pair of electronic switches 36. An integral number of STM-1 channels are assigned to each of these connections. Each electronic switch 36 is connected to the backbone 38 by eight fiber pairs, which contain a total of 800 space-wavelength channels or 51K STM-1 channels (in each direction).

A connection between a pair of electronic switches 36 can contain a large number of subscriber connections. A typical electronic switch 36 serves approximately 320K subscribers, and a subscriber can have multiple connections through the backbone 38. If there is an average of one connection per subscriber and if the connections are uniformly distributed among the switches 36, then there can be over 600 subscriber connections between a pair of electronic switches 36. The data flow in these connections is generally statistically independent from one connection to the next.

Many ATM connections can be bundled together within a physical layer connection through the backbone 38. As discussed previously, this bundling results in a reduction of the burstiness of the data. Even if the data rate on individual ATM connections varies greatly, the variation in the composite data rate for the bundle can be low. This improves the utilization efficiency of the physical layer channels through the backbone 38 and makes packet switching within the backbone 38 unnecessary. Note that the utilization efficiency increases for physical layer connections containing the largest number of ATM connections and having the largest number of assigned channels, which is a desirable result.

Similarly, many STM connections can be bundled within an optical connection through the backbone 38. Since STM connections require dedicated channels, the utilization efficiency of the optical connection will be low if the utilization of the STM connections is low. However, the utilization of the STM connections can be improved if channels can be switched quickly. For a bursty application, such as a large file transfer, channels can be quickly assigned to an STM connection and released when the transfer is completed. Time slots within a space-wavelength channel associated with an optical connection can be quickly reassigned to different STM connections within the bundle. However, the assignment of space-wavelength channels to physical layer connections through the backbone 38 does not need to be changed every time an STM connection is changed. Rather, assignment of physical layer channels can be varied slowly as the composite data rate of the bundle varies.

Figure 8:
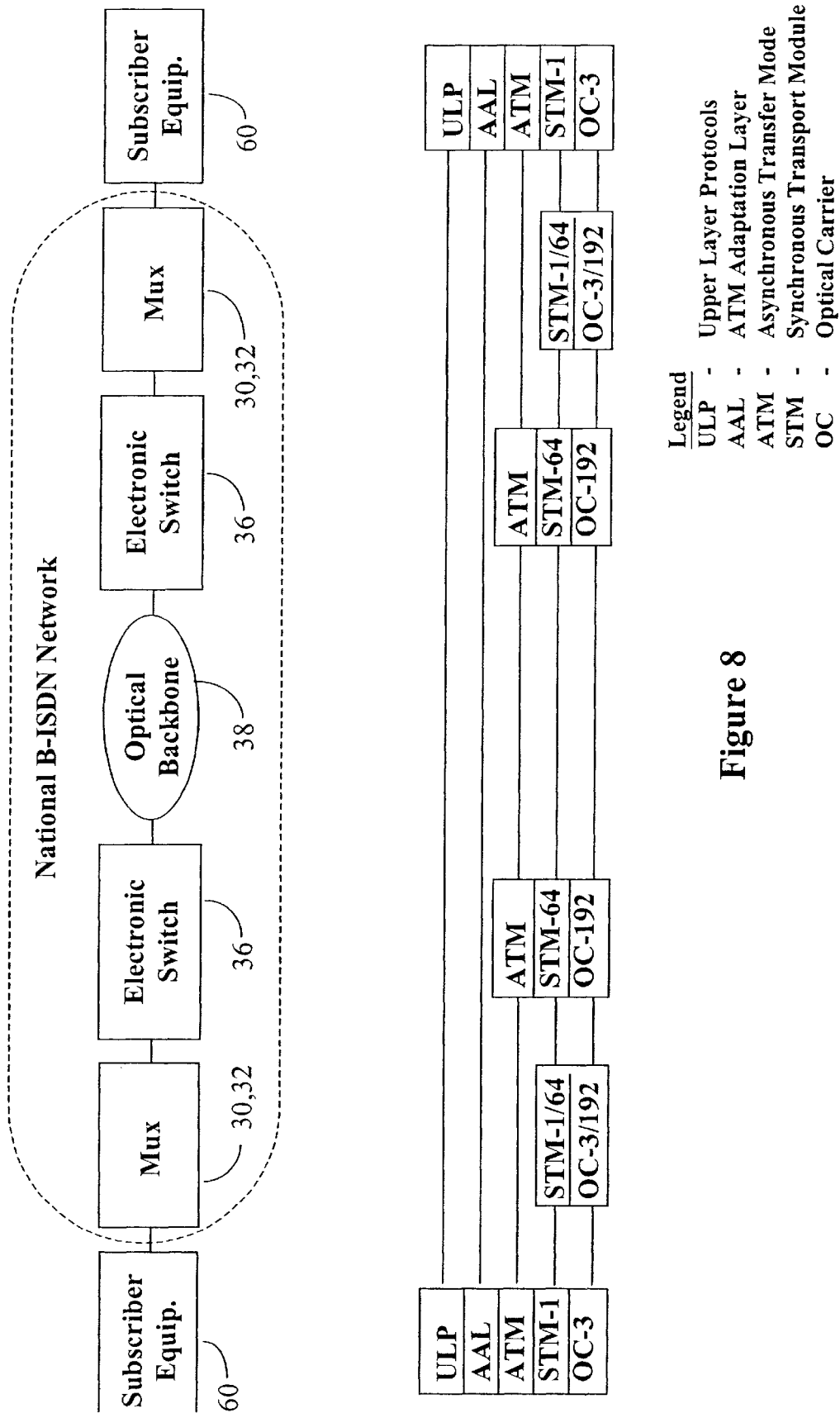
FIG. 8 is a diagram illustrating communications protocols used in the network of FIG. 4.

FIG. 8 shows a diagram of the communication protocols used in conjunction with ATM operation of the proposed national B-ISDN network. The optical backbone 38 operates at the physical layer. Within each space-wavelength channel, an optical signal is transmitted at 10 Gb/s in accordance with the OC-192 protocol, which is the optical equivalent of STM-64. The multiplexers 30 and COs 32 (indicated together as "MUX" in FIG. 8) also operate at the physical layer, interleaving 64 STM-1 frames to form an STM-64 frame. There may be multiple stages of multiplexing involved with this transformation.

In the case shown, there is an STM-64 connection between a pair of electronic switches 36. Lower order STM connections or multiple STM-64 connections are also possible. Many ATM connections are maintained between each pair of electronic switches 38 over the STM connection(s). An ATM connection involves subscribers at both ends of the network and electronic switches in the middle of the network. The ATM adaptation layer (AAL), which is implemented in subscriber equipment 60, divides a data block into ATM cells on one end and reconstructs the data block from ATM cells on the other end.

Upper layer protocols, such as the Transmission Control Protocol (TCP), the Internet Protocol (IP), and application layer protocols, can be implemented in the subscriber equipment 60 over ATM and AAL. End-to-end TCP connections can be established between a pair of subscribers. IP can provide the mechanism for interfacing with legacy networks, such as the Internet or legacy local area networks (LANs).

For STM operation, the AAL and ATM layers can be eliminated. The upper layer protocols run directly over the physical layer.

As previously discussed, the optical backbone 38 operates at the physical layer with an integral number of STM-1 channels assigned to each connection through the backbone 38. It is desirable to assign an even larger group of channels to certain connections through the backbone. Within segments of the optical backbone 38 an integral number of space-wavelength channels are assigned to particular connections. These space-wavelength channels can be switched intact by the network segment, which simplifies the processing and allows the backbone 38 to accommodate extremely high data rates.

A known technique for switching optical signals is based on spatial gating and shifting of optical beams. With this technique, signals that follow the same path through a network segment are bundled together in a contiguous set of space-wavelength channels. At switching elements within the network segment, optical beams are formed such that within each beam the signals destined for a particular location are spatially distributed. A beam is divided into segments and each beam segment is guided along an optically transparent path from the switch input to the switch output, hence the name "transparent optical switching."

With the processing technique described above, signal characteristics are unaltered as signals traverse the switch. Thus, data rates are limited by the applied signal modulation, not by signal processing within the switch. For example, the data rate on each space-wavelength channel is limited to 10 Gb/s by the applied STM-64 modulation, which passes transparently through the switch.

Figure 9:
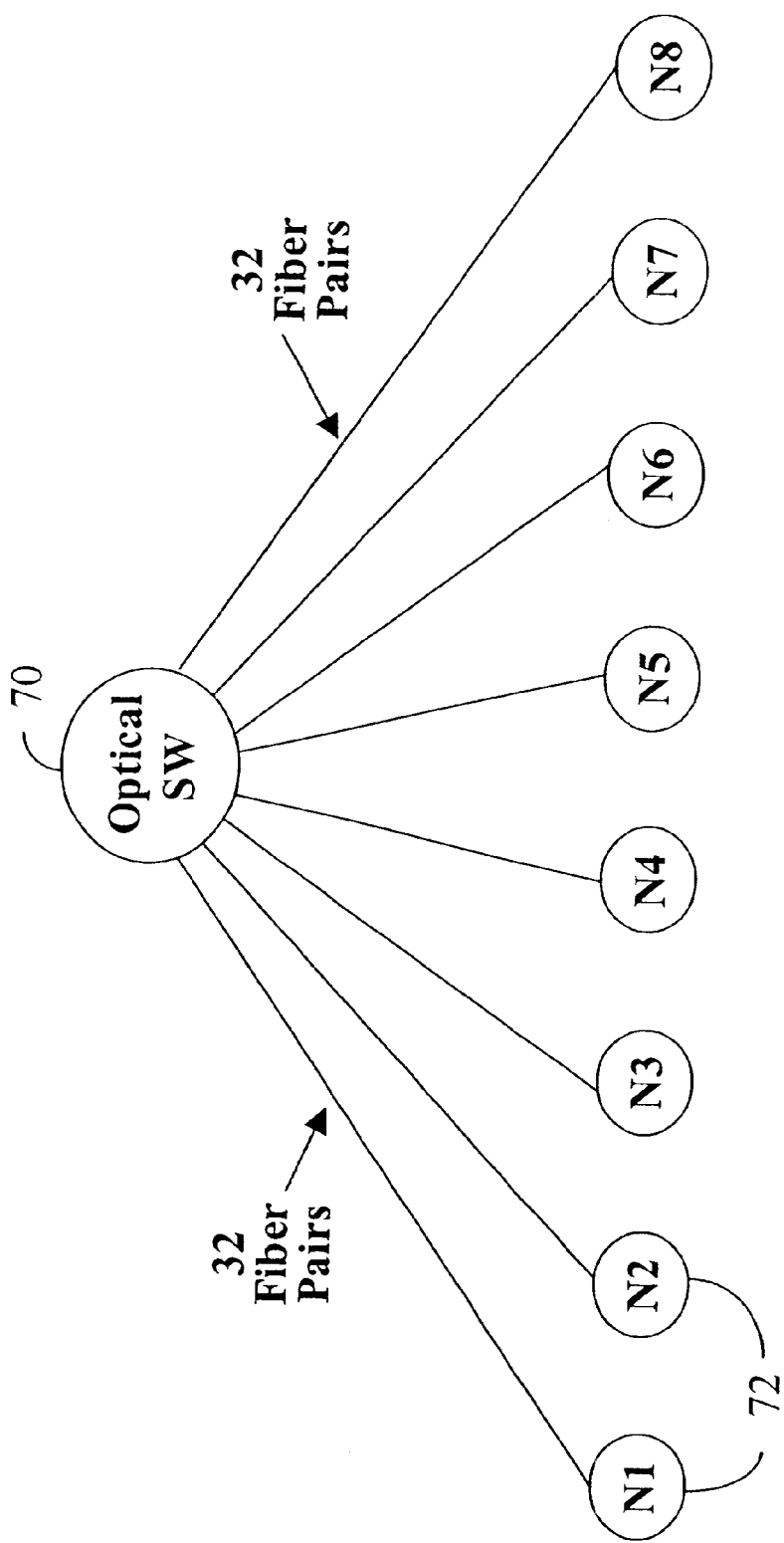
FIG. 9 is a block diagram illustrating a simplified network configuration in which all-optical switching of space channels is used.

FIG. 9 shows a simplified network consisting of an optical switch 70 and eight nodes 72 (labeled N1–N8); this configuration is used to illustrate transparent optical switching. Each node is connected to the switch 70 by 32 fiber pairs, which correspond to 32 space channels in each direction. At the switch 70, there are a total of 256 input fibers and 256 output fibers. The switch 70 connects the signals within each input fiber to an output fiber.

Figure 10:
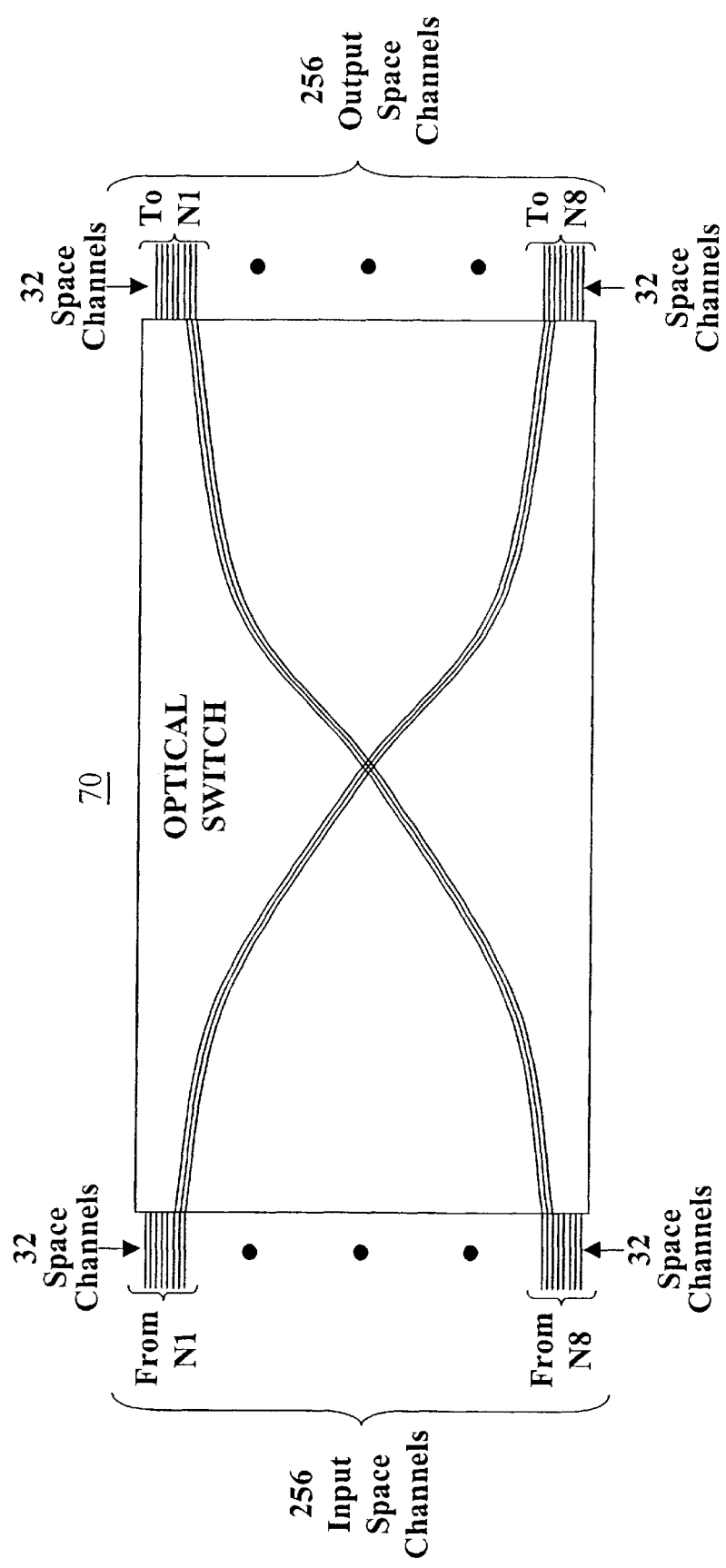
FIG. 10 is a diagram depicting the operation of an optical switch in the simplified network of FIG. 9.

The operation of the optical switch 70 is illustrated in FIG. 10. The 32 input fibers from node N1 contain seven sets of contiguous fibers, each of which contains signals destined for one of the other nodes (N2–N8). The signals within a contiguous set of fibers are switched as a group to the output fibers connected to one of the other nodes. The 32 output fibers connected to N1 contain seven sets of continuous fibers, each of which contains signals that have been switched from one of the other nodes (N2–N8). Within the switch, 56 sets of contiguous space channels are switched as a group, with each set containing signals from one of the eight nodes destined for one of the seven other nodes.

The advantages of the switching approach of FIGS. 9 and 10 are speed and simplicity. Signals traverse the switch 70 unaltered and without delays, which translates into high throughput and low latency. Also, with this approach, the number of switching elements required to switch 56 sets of space channels is considerably less than the number of elements required to individually switch signals within 256 input fibers onto 256 output fibers. On the other hand, with this switching approach, the number of nodes 72 that can be interconnected is relatively small. An approach that provides finer quantization and that can be used to interconnect a larger number of nodes is presented next.

Figure 11:
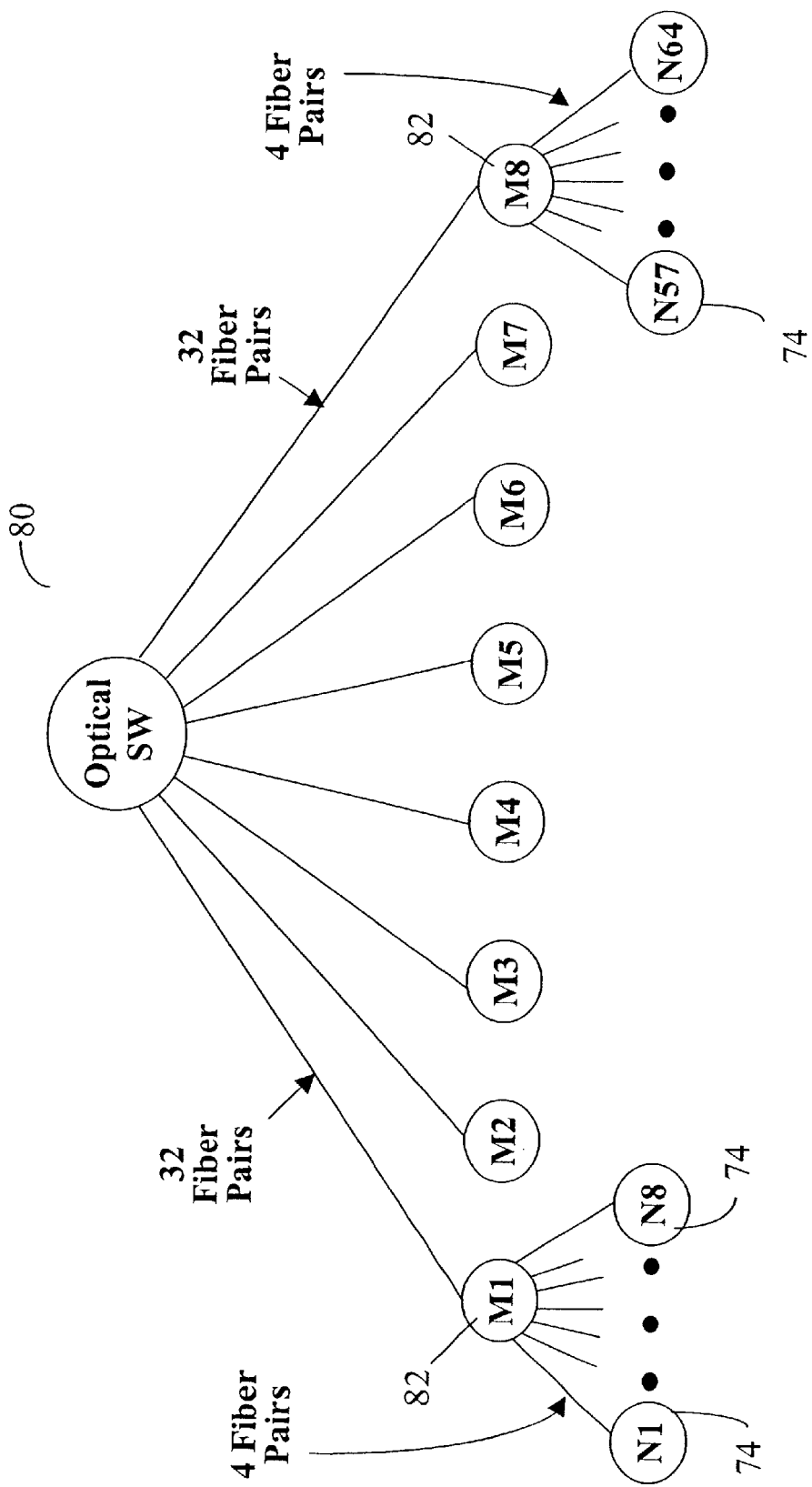
FIG. 11 is a block diagram illustrating a simplified network configuration in which all-optical switching of space and wavelength channels is used.

FIG. 11 shows a network that interconnects 64 nodes (N1–N64). This network consists of an optical switch 80 connected to eight optical multiplexers 82 (M1–M8), each of which is connected to eight nodes 74. Each multiplexer 82 is connected to the switch by 32 fiber pairs. Thus, the total number of space channels (256) is the same as in the previous example. However, in this case, each space channel contains 100 wavelength channels, which provides finer quantization of the channels and allows a larger number of nodes 74 to be interconnected.

There are 4032 (64×63) connections through the network and a total of 25,600 space-wavelength channels (256 space channels times 100 wavelengths). An integral number of space-wavelength channels are assigned to each connection through the network. The number of channels assigned to a particular connection is varied based on demand and channel availability. For each connection, the optical switch 80 maps space-wavelength channels at the input to space-wavelength channels at the output.

Figure 12:
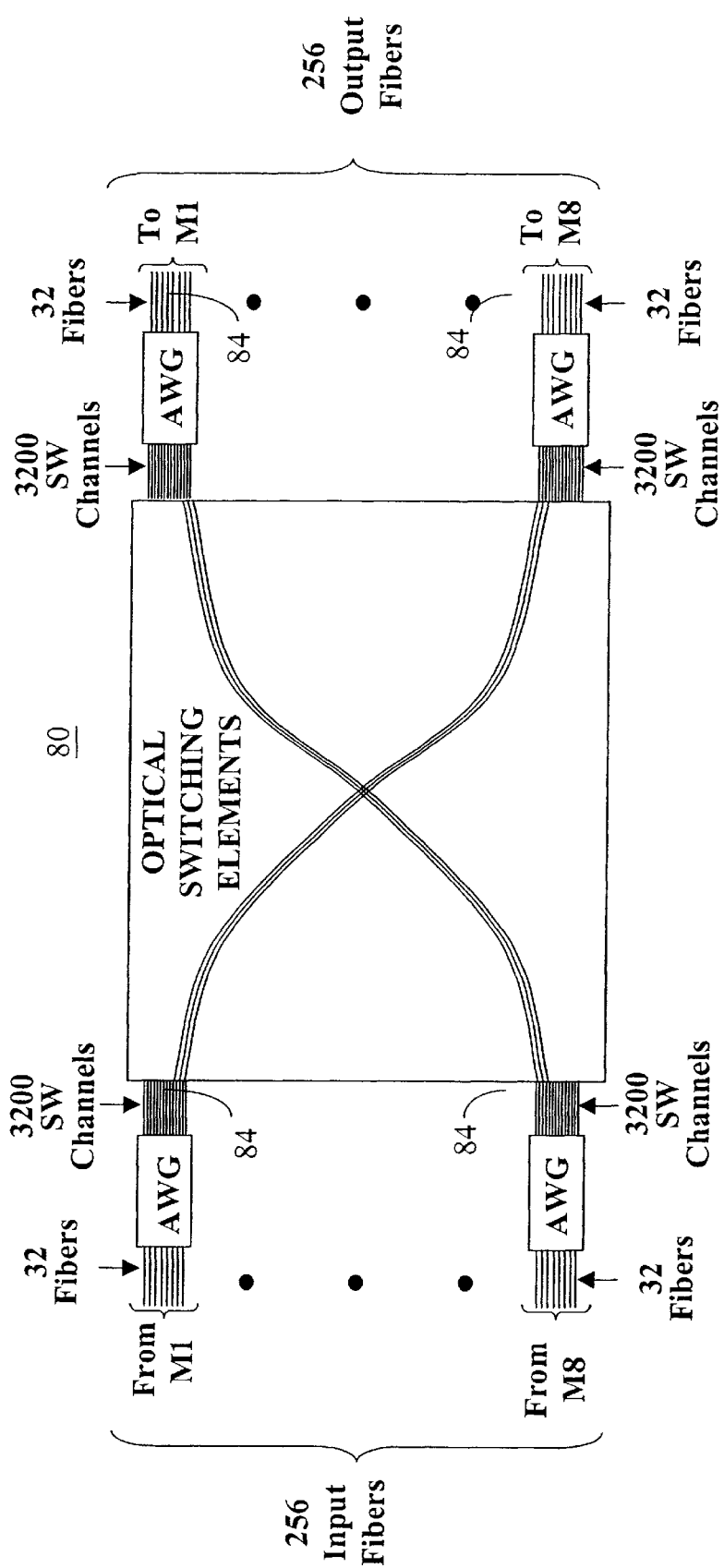
FIG. 12 is a diagram depicting the operation of an optical switch in the simplified network of FIG. 11.

The operation of the optical switch 80 in FIG. 11 is illustrated in FIG. 12. Optical beams are formed by passing the input signals from each of the multiplexers 82 through arrayed waveguide gratings (AWGs) 84, which disperse the signals at different wavelengths. Within a beam, signals from different fibers and signals at different wavelengths within the same fiber are spatially distributed. Furthermore, signals destined for a particular node are assigned a contiguous set of space-wavelength channels, so signals within these assigned channels are spatially contiguous with a dispersed beam. Each dispersed beam is divided into segments such that each beam segment contains signals destined for a set of output fibers connected to a particular node 82. Each beam segment is guided along an optically transparent path from the switch input to the switch output. At the switch, output beam segments from different inputs are combined and the signals within these segments are coupled onto the output fiber connected to a particular node 82. This is accomplished by passing spatially separated signals at different wavelengths through AWGs 84, which reverses the dispersion process and spatially compresses the signals.

In addition to retaining the advantages of the space switching approach previously described, this switching approach can accommodate many more nodes than space switching alone. With the switch 80 shown in FIG. 12, space-wavelength channels are switched intact by all-optical components. As with the space switch 70 of FIGS. 9 and 10, STM-64 signals pass through the space-wavelength switch 80 unaltered and without delay. Thus, the switch 80 can support a very high throughput with very low latency. The switch 80 of FIG. 12 accommodates 4032 (64×63) sets of space-wavelength channels, which makes it more complex than the space switch 70. However, the number of switching elements is much smaller than the number of elements required to individually switch signals within 3200 space-wavelength channels at the input onto 3200 space-wavelength channels at the output.

To employ the transparent optical switching technique described above, the space-wavelength channels must be assigned to each connection through the network such that when a beam is formed, signals associated with a particular connection are spatially adjacent. Furthermore, wavelengths should be assigned so that there is no conflict involving more than one signal at the same wavelength being directed onto an output fiber. In this way, wavelength translation can be avoided. To assure the proper alignment of signals and avid conflicts, assignments of space-wavelength channels must be coordinated throughout the network in FIG. 11.

Figure 13:
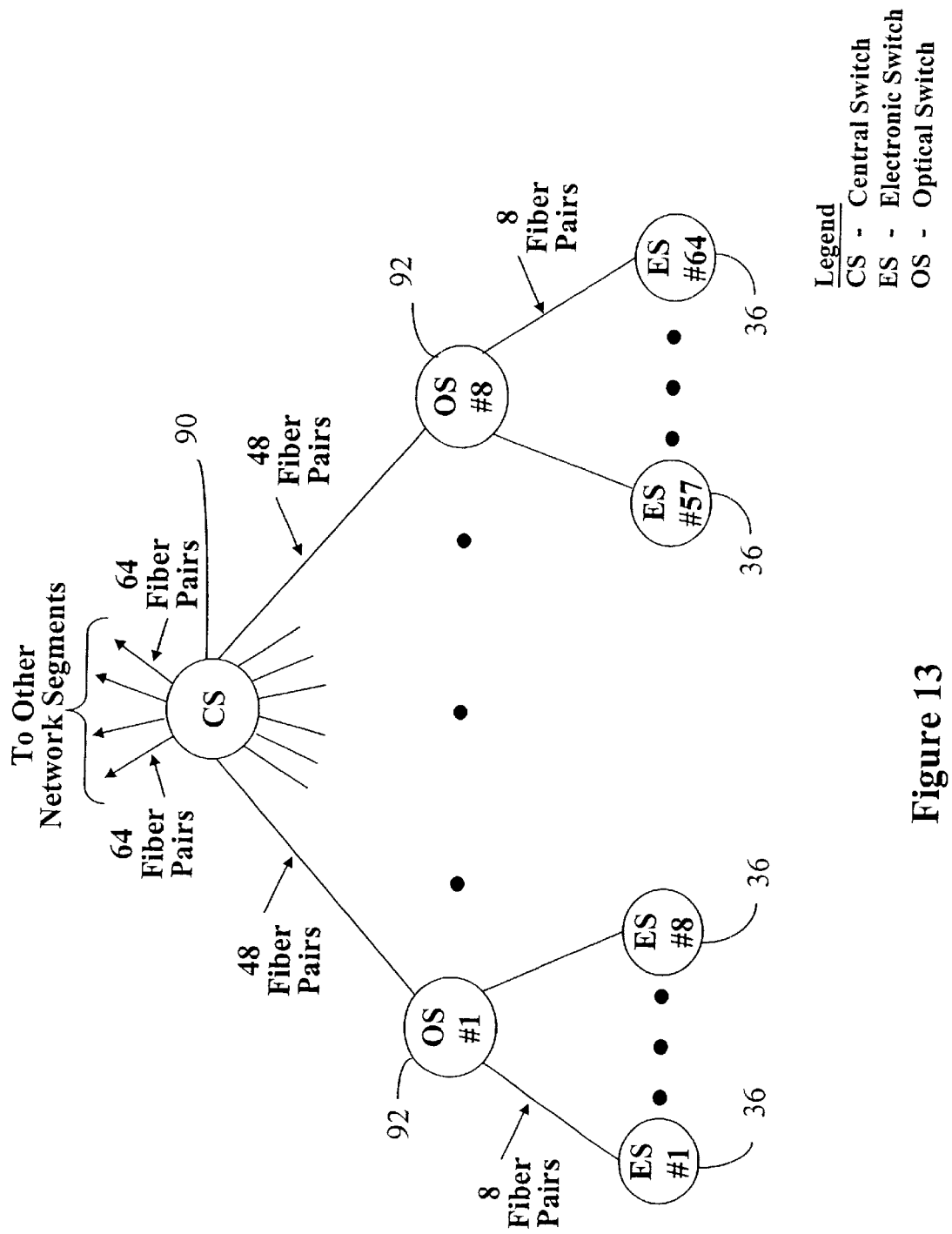
FIG. 13 is a block diagram of a lower hierarchical segment of an optical backbone in the network of FIG. 4.

FIG. 13 illustrates a practical implementation of the transparent optical switching concepts discussed above. The network segment consists of a central switch (CS) 90 and eight lower echelon optical switches 92 (OS#1–OS#8) interconnecting sixty-four electronic switches 36. The hierarchical structure facilitates the implementation of the optical switching concept. The network segment in FIG. 13 is scaled to cover approximately ⅛ of the contiguous United States. Eight such network segments can be deployed to cover the contiguous United States.

Each electronic switch 36 is connected by eight fiber pairs to an optical switch 92. Each of the lower echelon optical switches 92 is connected to the central switch 90 by 48 fiber pairs. The central switch 90 is also connected to the other network segments in the national network. Each fiber contains 100 wavelength channels, each containing an STM-64 (10 Gb/s) signal.

In the optical network segment including a CS 90 and eight associated optical switches 92, there are a total of 4032 (64×63) paths between all possible pairs of electronic switches 36. An optical connection is established along each of these paths, and an integral number of space-wavelength channels are assigned to each of these connections. The number of channels assigned to a particular connection is varied based on demand and channel availability. Since each space-wavelength channel contains an ATM-64 signal, multiple STM-64 connections can be established between a pair of electronic switches 36. STM-64 frames flow transparently through the optical switches 92, which operate at the optical sublayer of the physical layer.

The lower echelon optical switches 92 in FIG. 13 are analogous to the multiplexers 82 in FIG. 11. However, the optical switches 92 perform both switching and multiplexing functions, rather than multiplexing all signals from the electronic switches 36 and sending them to a higher level to be switched. For example, signals from ES#1 that are destined for any of switches ES#2–ES#8 are switched by OS#1, which minimizes propagation delays. Signals from ES#1 that are destined for any of switches ES#9–ES#64 are sent to the central switch (CS) 90 to be switched. It can be assumed that approximately ¼ of the traffic received by an OS 92 is switched locally, and ¾ of the traffic is passed on to the central switch 90. Thus, there are 64 fiber pairs connecting each OS 92 with the associated electronic switches 36 (8 pairs to each of 8 electronic switches), and 48 fibers connecting each OS 92 and the central switch 90.

The operation of the central switch 90 in FIG. 13 is similar to the operation of the optical switch 80 in FIG. 11. The central switch 90 performs the functions associated with switching of space-wavelength channels, previously described. While the optical switch 92 in FIG. 11 switches all the signals from the 64 nodes, not all the signals from the 64 nodes in FIG. 13 are sent to the central switch 90, as discussed above.

At each electronic switch 36, a contiguous set of space-wavelength channels is assigned to each of the connections to the other sixty-three electronic switches 36 connected to the same CS 90. Seven of these sets are assigned to connections through the OS 92 to the other electronic switches 36 connected to same OS 92. The other fifty-six sets of channels are assigned to connections through the central switch 90 to electronic switches 36 not connected to the same OS 92. A total of 400 space-wavelength channels are available for these connections, which correspond to an average of approximately seven channels per connection.

The restriction of an integral number of space-wavelength channels per connection results in a certain inefficiency. A connection that needs a capacity of 6.7 channels is assigned seven channels, which results in 0.3 times the channel capacity going unused. For each connection, the unused capacity varies between 0 and 1 times the capacity of a single channel, with an average value of 0.5. Thus, for 56 connections, a capacity equivalent to 28 times the channel capacity is wasted. This wasted capacity corresponds to approximately 7% of the total capacity of 400 channels. This inefficiency represents a relatively small price to pay to obtain the benefits (e.g., speed and simplicity) associated with all-optical processing.

Assignments of space-wavelength channels must be coordinated throughout the network segment. This coordination is performed using the space-wavelength channels that are set aside for signaling among the switches 36. In the interface between an electronic switch 36 and an optical switch 92, one space-wavelength channel (in each direction) out of a total of 800 channels is dedicated to signaling between the switches. Space-wavelength channel assignments for 511 connections are sent from the optical switch 92 to the electronic switch based on requested capacity and channel availability.

The restriction on the assignment of space-wavelength channels to avoid wavelength translation causes an additional inefficiency in the utilization of channel capacity. However, the loss in effective capacity due to this restriction is relatively small for the proposed network. Although this inefficiency can be avoided if wavelength translation is used, wavelength translation adds undesirable complexity to the optical network segment, and limits performance. Within an optical network segment, it appears that the better choice is to suffer some inefficiency in the interests of avoiding the drawbacks of wavelength conversion.

The optical network segment in FIG. 13 can support broadcasting, which can be useful for certain types of services. Generally, broadcasting is achieved by combining signals in the central switch 90 and transmitting the combined set of signals to all of the electronic switches 36 connected to the network segment. In one scheme, broadcast signals originating from any electronic switch 36 are sent through the associated OS 92 to a designated electronic switch 36 connected to the same OS 92. For example it may be that ES#4 is the designated electronic switch 36 among switches ES#1–ES#8. The designated electronic switch 36 combines the broadcast signals and sends them on a dedicated space-wavelength channel to the central switch 90 via the associated OS 92. At the central switch 90, broadcast signals from all the connected OSs 92 are optically replicated and sent back down through the network segment to the electronic switches 36. Each electronic switch 36 receives broadcast signals on eight space-wavelength channels, one channel for each of the lower echelon optical switches 92. The electronic switch 36 replicates the broadcast signals within these channels and distributes the replicated signals to subscribers. If desired, a selected subset of the broadcast signals can be sent by the electronic switch 36 to a particular subscriber.

Figure 14:
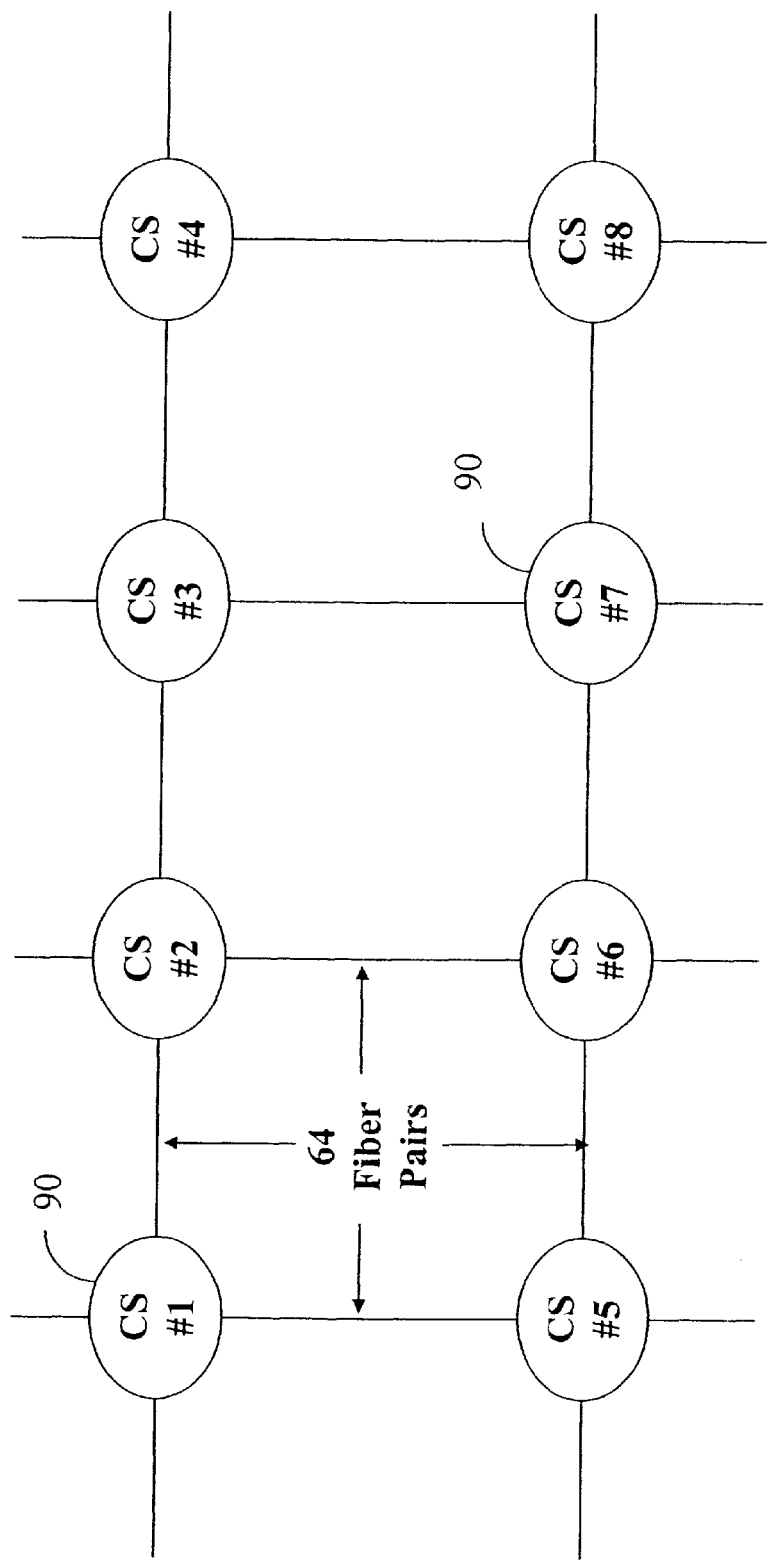
FIG. 14 is a block diagram of a topmost hierarchical level of an optical backbone in the network of FIG. 4.

Network segments similar to the optical segment of FIG. 13 can be joined together to form a national network. FIG. 14 illustrates the interconnection of eight of these segments to form a network that covers the contiguous United States. The network shown in FIG. 14 corresponds to the top echelon of the optical backbone 38 shown in FIG. 4. Each of the central switches 90 in FIG. 14 is connected to eight lower echelon optical switches 92 and sixty-four electronic switches 36 as shown in FIG. 13.

Although each individual network segment is hierarchical, the overall national network formed by interconnecting network segments has a mesh topology. Propagation distances and times are shorter for a mesh as opposed to a hierarchical topology, which is important for a network that covers a large area. Also, the mesh topology allows more independence between network segments, which facilitates implementation of the network in stages and extension of the network beyond national borders.

Physical layer connections through the optical backbone 38 (FIG. 4) are established between an electronic switch 36 and the other 511 electronic switches 36 in the national network, with an integral number of STM-1 channels assigned to each of these connections. The connections among the sixty-four electronic switches 36 within a network segment attached to single CS 90 are discussed above. It will be recalled that within such a network segment, multiple contiguous space-wavelength channels are dedicated to the connections among the electronic switches 36, which enables all-optical switching to be used by the CS 90 and each OS 92 for intra-segment traffic. Unfortunately, for inter-segment traffic (i.e., traffic between pairs of electronic switches 36 connected to different CSs 90), it is impractical to assign capacity in increments of space-wavelength channels, because the volume of traffic between any two such electronic switches 36 may not justify a full STM-64 connection. It is therefore necessary to multiplex these connections in the time domain to reduce the channel allocation granularity to increments of STM-1. A mechanism for performing this multiplexing is described below.

Figure 15:
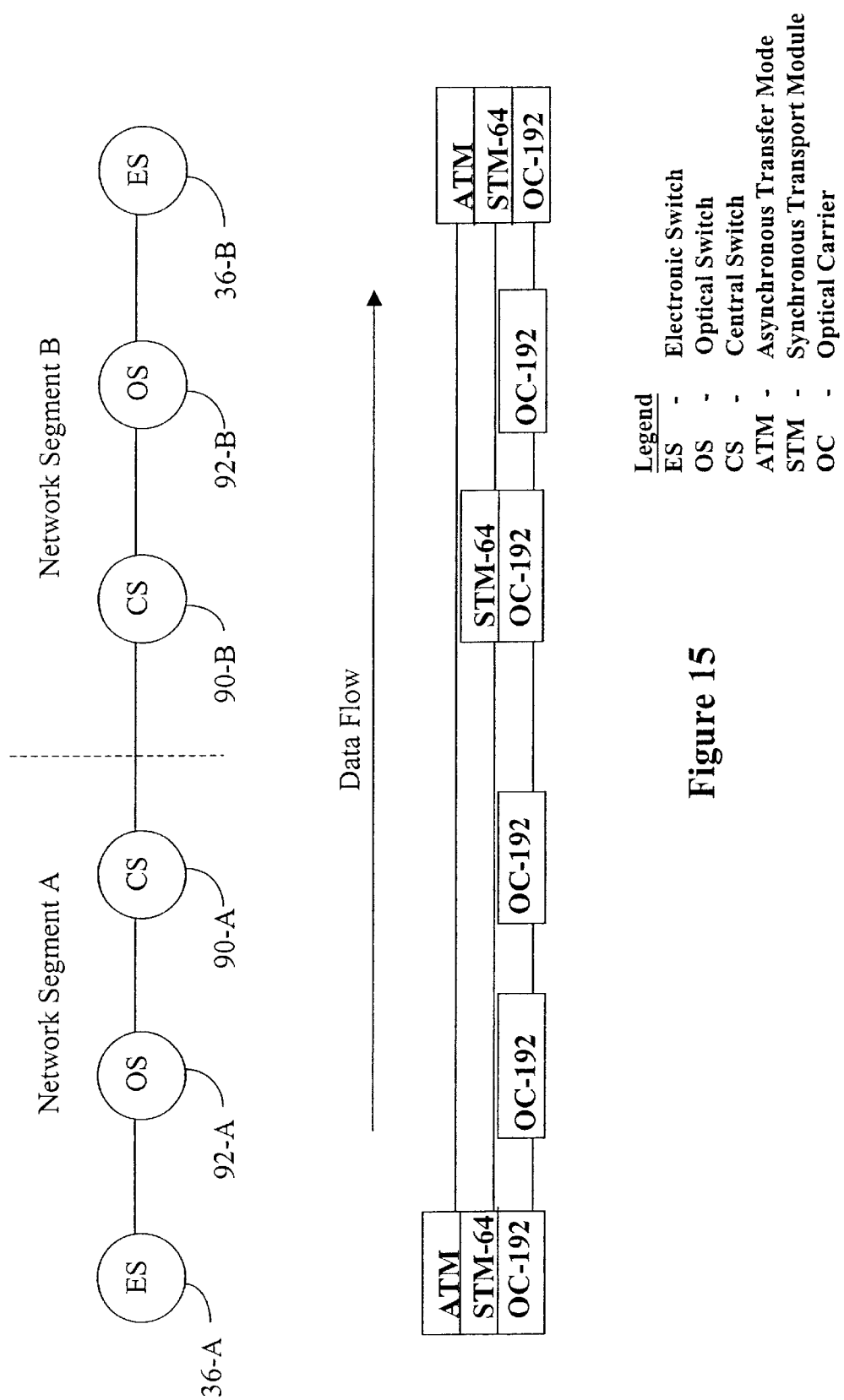
FIG. 15 is a diagram depicting the use of communications protocols between electronic switches in different regional segments in the network of FIG. 4.

FIG. 15 shows the communication protocols associated with data transfer through the overall network. In this case, two electronic switches 36 are connected to each other through two optical network segments. Data from the electronic switch 36-A at the left of the diagram flows transparently through the optical switch 92-A and the central switch 90-A of Segment A. At the central switch 90-B of Segment B, the data received from the electronic switch 36-A is processed electronically and wavelength conversion is performed. This approach allows wavelength channels to be assigned independently from one network segment to the next. Also, the STM-64 interface between an electronic switch 36 and a central switch 90 can support separate connections between the electronic switch 36 and multiple electronic switches 36 at the other end, in increments of STM-1 rates. Many ATM connections can be supported by each physical layer STM-1 connection between a pair of electronic switches 36. For data flow in the opposite direction, the protocol diagram is similar except that the STM-64 interface shifts to the other central switch 90-A.

With multiple network segments thus interconnected, the central switches 90 perform both optical and electronic switching. Thus, the operation of the central switches 90 involves a combination of the functions of the switches shown in FIGS. 6 and 12.

In addition to providing a means for interconnecting network segments within the U.S., the network in FIG. 14 can interface with external networks. Additional network segments can be constructed beyond the borders of the contiguous U.S. and linked to the U.S. national network. The mesh architecture allows network segments to operate autonomously before being linked together. This facilitates a smooth transition to an integrated network.

Eventually, the network can be extended to become a global network. This requires increasing the capacity of the fiber optic transmission lines and switches at the higher echelons of the network.

What is claimed is:

1. A wide-area broadband communications network including a network access tier, a switching tier, and an optical backbone, the communications network being operative to establish connections among subscribers and to switch subscriber data along the connections, such that data sent along any connection between any pair of subscribers requires no more than one pass through the optical backbone and no more than two passes through the switching tier, the communications network being operative to support multiple communications functions including voice, data communications, and full motion video, the network access tier being operative to concentrate heterogeneous data formatted into standard data rate digital signals of a first rate for a large number of subscribers onto a much smaller number of optical fibers connecting the network access tier to the switching tier, the network access tier being operative to receive heterogeneous data formatted into standard data rate digital signals of a second rate higher than the first rate from the switching tier and distribute the received data to the subscribers, the network access tier including one or more layers of multiplexers/demultiplexers and associated transmission lines, each multiplexer/demultiplexer being operative to perform time multiplexing/demultiplexing and wavelength multiplexing/demultiplexing of the standard data rate digital signals such that signals of the second rate flowing between the network access tier and the switching tier are multiplexed in the time and wavelength dimensions, the switching tier including a single layer of optical-electrical-optical (OEO) switches and associated fiber optic transmission lines, such that each subscriber is connected via the network access tier to one or more OEO switches and each OEO switch is directly connected by one or more optical fibers to the optical backbone, the switching tier being operative to establish physical and/or virtual connections among the subscribers and to switch subscriber data on these connections, each OEO switch being operative to switch data among the subscribers connected to the switch via the network access tier, each OEO switch being operative to switch data between subscribers connected to the switch and the other OEO switches in the switching tier with the data flowing through space-wavelength channels of the optical backbone, the optical backbone being operative to fully interconnect the OEO switches in the switching tier such that a physical layer connection is established through the optical backbone between each OEO switch and all the other OEO switches in the switching tier, each physical layer connection being assigned an integral number of the space-wavelength channels thereby supporting a large number of subscriber connections, the optical backbone including a plurality of electro-optical and/or all-optical switches and associated fiber optic transmission lines, with each switch in the optical backbone being operative to switch intact standard rate signals of the second rate carrying a large number of subscriber signals.

2. A communications network according to claim 1, wherein the multiplexers/demultiplexers in the network access tier include electro-optical multiplexers/demultiplexers operative to perform time and/or wavelength division multiplexing/demultiplexing of multiple optical subscriber signals to/from the optical fibers connected to the switching tier, with some of the multiplexers/demultiplexers being operative to exchange standard data rate signals with subscribers on optical fibers and some of the multiplexers/demultiplexers being operative to send and receive signals at a lower data rate with subscribers on twisted pair conductors.

3. A communications network according to claim 1, wherein the standard rate signals support virtual connections on which fixed-length data cells are transferred, and wherein the electro-optical switches at the switching tier are operative to employ fast cell switching to switch the data cells among the connected subscribers via the optical backbone tier to and from subscribers connected to other electro-optical switches.

4. A communications network according to claim 1, wherein the standard rates of the digital signals correspond to the data rates of the synchronous digital hierarchy (SDH), such that the data rate for subscribers connected to the network by optical fibers is the fundamental SDH data rate of 155 Mb/s, and the data rates of signals on trunking fibers correspond to higher order SDH data rates.

5. A communications network according to claim 1, wherein the optical backbone interconnecting the OEO switches includes both all-optical switches and electro-optical switches along with associated trunking fibers; with the arrangement of switches not being restricted to a hierarchical topology, each all-optical switch being operative to switch optical signals in the space and wavelength dimensions without converting said signals to electrical signals, each electro-optical switch being operative to switch optical signals in the space, wavelength, and time dimensions by first converting said signals to electric signals.

* * * * *